US00RE47563E

(19) United States
(12) Reissued Patent
Cutsforth

(10) Patent Number: US RE47,563 E
(45) Date of Reissued Patent: Aug. 6, 2019

(54) BRUSH HOLDER ASSEMBLY WITH QUICK DISCONNECT TERMINAL

(71) Applicant: CUTSFORTH, INC., Cohasset, MN (US)

(72) Inventor: Robert S. Cutsforth, Bellingham, WA (US)

(73) Assignee: CUTSFORTH, INC., Cohasset, MN (US)

(21) Appl. No.: 15/377,501

(22) Filed: Dec. 13, 2016

Related U.S. Patent Documents

Reissue of:
(64) Patent No.: 8,922,092
Issued: Dec. 30, 2014
Appl. No.: 13/041,866
Filed: Mar. 7, 2011

(51) Int. Cl.
*H01R 39/38* (2006.01)
*H01R 39/36* (2006.01)
*H02K 13/00* (2006.01)
*H02K 11/00* (2016.01)

(52) U.S. Cl.
CPC ..... *H01R 39/383* (2013.01); *Y02E 10/725* (2013.01)

(58) Field of Classification Search
CPC ..... H01R 39/383; H02K 13/00; Y02E 10/725
USPC ..... 310/71, 242, 245, 249, 239, 240, 241; 439/28, 29, 212, 345, 342, 865, 888
See application file for complete search history.

(56) References Cited

U.S. PATENT DOCUMENTS 629,418 A 7/1899 Baylis
985,951 A 3/1911 Sparks
1,132,304 A 3/1915 Cunningham
1,488,574 A 4/1924 Wagner
1,488,575 A 4/1924 Wagner
2,194,620 A 3/1940 Sekyra
2,840,732 A 6/1958 Nottelmann
3,272,336 A 9/1966 Humbert
3,316,431 A 4/1967 Manoni
3,387,155 A 6/1968 Krulls
3,432,708 A 3/1969 Bissett
(Continued)

FOREIGN PATENT DOCUMENTS

EP 847126 A1 6/1998
GB 1326828 8/1973
(Continued)

OTHER PUBLICATIONS

Machine Translation JP2001351759 (2001).*
(Continued)

*Primary Examiner* — Minh Nguyen
(74) *Attorney, Agent, or Firm* — Seager, Tufte & Wickhem LLP

(57) ABSTRACT

A brush holder assembly including a quick disconnect assembly for quickly disconnecting a brush and electrical leads from a remaining component of the brush holder assembly to facilitate brush removal and replacement. The quick disconnect assembly includes a receptacle having a cavity for removably receiving and an end of the electrical lead, such as the nugget, and a resilient clip. When positioned in the cavity of the receptacle, the resilient clip urges a surface of the nugget into direct contact with a surface of the receptacle partially defining the cavity, completing an electrical current pathway from the brush through the electrical lead to the nugget, and from the surface of the nugget to the surface of the receptacle.

39 Claims, 30 Drawing Sheets

(56) References Cited

U.S. PATENT DOCUMENTS

| | | | | |
|---|---|---|---|---|
| 3,445,705 | A | 5/1969 | Irwin | |
| 3,466,481 | A | 9/1969 | Sckerl | |
| 3,482,135 | A | 12/1969 | Hurlin | |
| 3,521,102 | A | 7/1970 | Kumar | |
| 3,656,018 | A | 4/1972 | Maher | |
| 3,710,478 | A | 1/1973 | Krulls | |
| 3,842,302 | A | 10/1974 | Apostoleris | |
| 3,864,803 | A | 2/1975 | Ohmstedt et al. | |
| 3,867,659 | A | 2/1975 | Seaburg et al. | |
| 3,898,492 | A | 8/1975 | Vassos et al. | |
| 3,967,148 | A | 6/1976 | Walsh | |
| 3,968,391 | A | 7/1976 | Blank | |
| 4,082,975 | A | 4/1978 | Azarov et al. | |
| 4,212,509 | A * | 7/1980 | Brooks et al. | 439/396 |
| 4,296,346 | A | 10/1981 | Ooki et al. | |
| 4,329,611 | A | 5/1982 | Ohmstedt et al. | |
| 4,329,612 | A | 5/1982 | Averill | |
| 4,340,832 | A | 7/1982 | Cheetham | |
| 4,354,128 | A | 10/1982 | Chew et al. | |
| 4,355,254 | A | 10/1982 | Oki et al. | |
| 4,366,404 | A | 12/1982 | Ziegler | |
| 4,409,508 | A | 10/1983 | Ooki et al. | |
| 4,420,705 | A | 12/1983 | Kimberlin | |
| 4,513,495 | A | 4/1985 | Kimberlin | |
| 4,633,552 | A | 1/1987 | Eriksson | |
| 4,739,209 | A | 4/1988 | Sherman | |
| 4,873,464 | A | 10/1989 | Wang | |
| 4,889,006 | A * | 12/1989 | Kolinske et al. | 74/502.4 |
| 4,963,779 | A | 10/1990 | Lentino | |
| 5,043,619 | A * | 8/1991 | Kartman, Jr. | 310/242 |
| 5,159,222 | A | 10/1992 | Southall | |
| 5,256,925 | A | 10/1993 | Cutsforth | |
| 5,444,320 | A | 8/1995 | Clarke et al. | |
| 5,608,280 | A | 3/1997 | Tamemoto et al. | |
| 5,736,805 | A | 4/1998 | Hyatt | |
| 5,753,992 | A * | 5/1998 | Avitable et al. | 310/239 |
| 5,939,812 | A | 8/1999 | Wetzel | |
| 5,949,175 | A | 9/1999 | Cummins | |
| 6,087,754 | A | 7/2000 | Berger | |
| 6,124,652 | A | 9/2000 | Karasa | |
| 6,133,665 | A | 10/2000 | Prell et al. | |
| 6,169,351 | B1 | 1/2001 | Bohart | |
| 6,246,145 | B1 | 6/2001 | Morimoto | |
| 6,255,955 | B1 | 7/2001 | Blaettner | |
| 6,326,716 | B1 | 12/2001 | Niimi | |
| 6,356,004 | B1 | 3/2002 | Porter et al. | |
| 6,548,934 | B1 | 4/2003 | Porter et al. | |
| 6,680,556 | B2 | 1/2004 | Menz | |
| 6,824,577 | B2 | 11/2004 | Deshpande | |
| 6,960,922 | B2 | 11/2005 | Klaar | |
| 7,034,430 | B2 | 4/2006 | Custforth et al. | |
| 7,122,935 | B2 | 10/2006 | Custforth | |
| 7,218,028 | B2 | 5/2007 | Annis et al. | |
| 7,338,599 | B2 | 3/2008 | Hiranga et al. | |
| 7,365,470 | B1 | 4/2008 | Eger et al. | |
| 7,608,970 | B2 | 10/2009 | Eger et al. | |
| 7,880,362 | B2 | 2/2011 | Cutsforth et al. | |
| 2003/0151328 | A1 * | 8/2003 | Cutsforth | H01R 39/38 310/239 |
| 2004/0245886 | A1 | 12/2004 | Uchida | |
| 2005/0156477 | A1 | 7/2005 | Bocka | H01R 39/385 310/239 |
| 2006/0119211 | A1 | 6/2006 | Annis et al. | |
| 2008/0197745 | A1 | 8/2008 | Eger et al. | |

FOREIGN PATENT DOCUMENTS

| | | | |
|---|---|---|---|
| GB | 1326828 | A | 8/1973 |
| JP | 2000303816 | A | 10/2000 |
| JP | 2001351759 | A * | 12/2001 |
| WO | 2009051042 | A1 | 4/2009 |
| WO | WO 2009051042 | A1 * | 4/2009 |
| WO | WO 2009069402 | | 4/2009 |
| WO | 2009069402 | A1 | 6/2009 |
| WO | 2010128080 | A1 | 11/2010 |

OTHER PUBLICATIONS

Documents depicting brush holder designs, sent by applicant on Apr. 5, 2002 (3 pgs.).

Documents depicting various processes of electropolishing, sent by applicant on Dec. 17, 2002 (3pgs.).

* cited by examiner

BRUSH HOLDER ASSEMBLY WITH QUICK DISCONNECT TERMINAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The disclosure is directed to a brush holder assembly with a quick disconnect terminal for decoupling an electrical connection for a brush. More particularly, the disclosure is directed to a quick disconnect assembly for removably coupling a brush into electrical contact with a component of a brush holder assembly. In some instances, the quick disconnect assembly may be used in a variety of other electrical applications for quickly disconnecting an electrical connection.

BACKGROUND

A purpose of a brush in an electrical device is to pass electrical current from a stationary contact to a moving contact surface, or vice versa. Brushes and brush holders may be used in electrical devices such as electrical generators, electrical motors, and/or slip ring assemblies, or sliding connection applications, for example, slip ring assemblies on a rotating machine such as a rotating crane, a wind turbine or a linear sliding connection on a monorail. Brushes in many electrical devices are blocks or other structures made of conductive material, such as graphite, carbon graphite, electrographite, metal graphite, or the like, that are adapted for contact with a conductive surface or surfaces to pass electrical current.

In some designs, a box type brush holder is used to support the brush during operation. The brush and box are designed such that the brush can slide within the box to provide for continuing contact between the brush and the conductive surface contacted by the brush. Typically a spring, such as a constant force spring, presses against the upper surface of the brush to maintain contact between the lower surface of the brush and the conductive surface.

During the duration of operation of the electrical device, the brush will be reduced in size, or get shorter (i.e., diminish in longitudinal length), for example, as the wear surface of the brush in frictional sliding contact with the conductive surface wears down. Once a brush has worn beyond a threshold amount, the brush and/or other components may need to be replaced and/or maintenance may need to be performed.

Accordingly, there is a desire to provide alternative ways in which a brush may be quickly and efficiently disconnected from an electrical current pathway in order to facilitate removal and replacement of brushes from an electrical device, such as an electrical generator.

SUMMARY

The disclosure is directed to several alternative designs, materials and methods of manufacture and use of brush holder structures and assemblies and electrical connections in brush holder assemblies.

Accordingly, one illustrative embodiment is a brush holder assembly including a brush holder mounted to a stationary member and a brush slidably disposed in the brush holder. The assembly further includes an electrical lead having a first end secured to the brush and a second end, with a resilient clip removably coupled to the second end of the electrical lead. Additionally, the brush holder assembly includes a receptacle for removably receiving the second end of the electrical lead and the resilient clip therein. An electrical pathway is provided from the brush, through the electrical lead, to a surface of the receptacle.

Another illustrative embodiment is an assembly for providing an electrical current pathway through a brush holder assembly. The assembly includes a brush for contacting a moving conductive surface, an electrical lead extending from the brush having a first end secured to the brush and a nugget at the second end of the electrical lead, a resilient clip removably coupled to the nugget, and a receptacle having a cavity for removably receiving the nugget and the resilient clip therein. When positioned in the cavity of the receptacle, the resilient clip urges a surface of the nugget into direct contact with a surface of the receptacle partially defining the cavity, completing an electrical current pathway from the brush through the electrical lead to the nugget, and from the surface of the nugget to the surface of the receptacle.

Another illustrative embodiment is an assembly for providing an electrical current pathway through a brush holder assembly. The assembly includes a brush for contacting a moving conductive surface, an electrical lead having a first end secured to the brush and a second end. The assembly also includes a nugget at the second end of the electrical lead. The nugget includes a rear surface, a front surface opposite the rear surface, and first and second side surfaces extending between the front surface and the rear surface. A resilient clip is removably coupled to the nugget. The resilient clip contacts the front surface and faces the first and second side surfaces of the nugget. The assembly also includes a receptacle having a cavity for removably receiving the nugget and the resilient clip therein. The resilient clip is elastically compressed in the cavity to press against the nugget and urge the rear surface of the nugget into direct contact with a surface of the receptacle partially defining the cavity. An electrical current pathway is provided from the brush through the electrical lead to the nugget, and from the rear surface of the nugget to the surface of the receptacle.

Yet another illustrative embodiment is a method of replacing a brush in a brush holder of a brush holder assembly. The method includes removing a first brush from the brush holder by decoupling an end of a first electrical lead extending from the first brush along with a first resilient clip from a receptacle and then inserting a second brush into the brush holder. The second brush has a second electrical lead extending from the brush and a second resilient clip coupled to an end of the second electrical lead. The end of the second electrical lead and the second resilient clip are inserted into a cavity of the receptacle to provide an electrical pathway from the second brush, through the second electrical lead, to a surface of the receptacle.

The above summary of some example embodiments is not intended to describe each disclosed embodiment or every implementation of the invention.

BRIEF DESCRIPTION OF THE DRAWINGS

The invention may be more completely understood in consideration of the following detailed description of various embodiments in connection with the accompanying drawings, in which.

Figure 1:
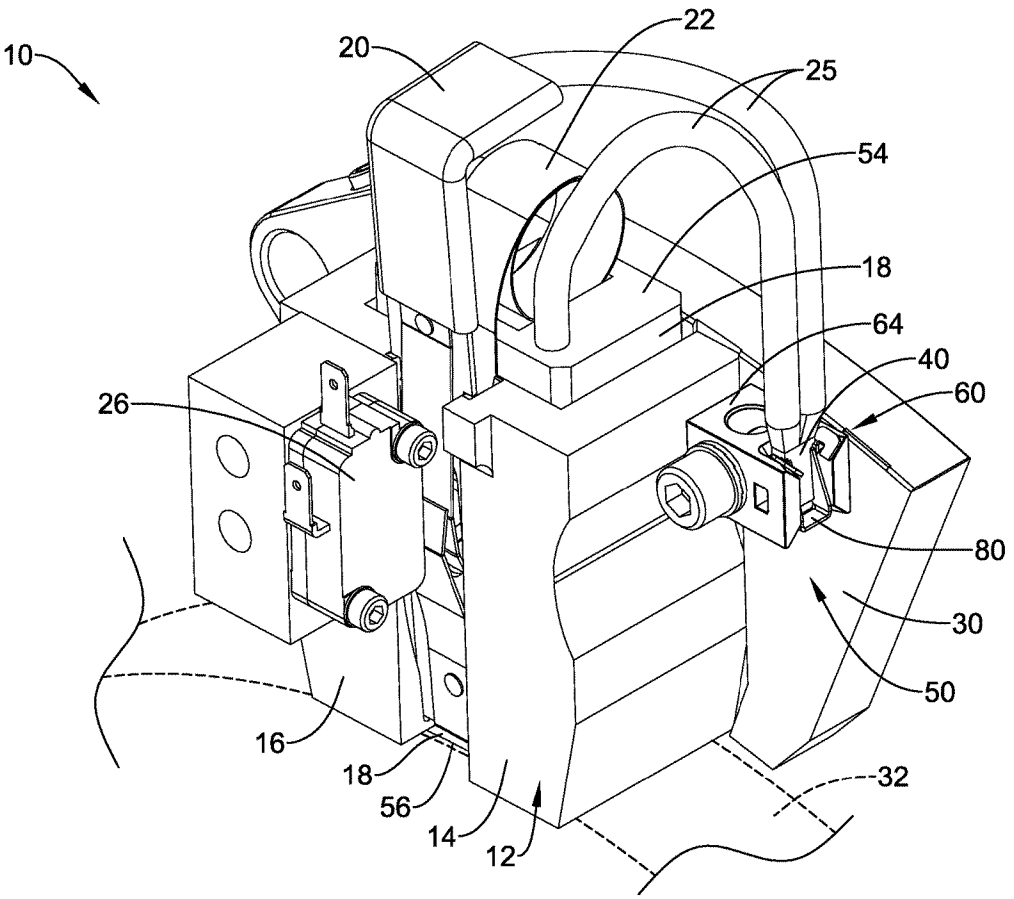
FIG. 1 is a perspective view of an exemplary brush holder assembly.

While the invention is amenable to various modifications and alternative forms, specifics thereof have been shown by way of example in the drawings and will be described in detail. It should be understood, however, that the intention is not to limit aspects of the invention to the particular embodiments described. On the contrary, the intention is to cover all modifications, equivalents, and alternatives falling within the spirit and scope of the invention.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

Figure 2:
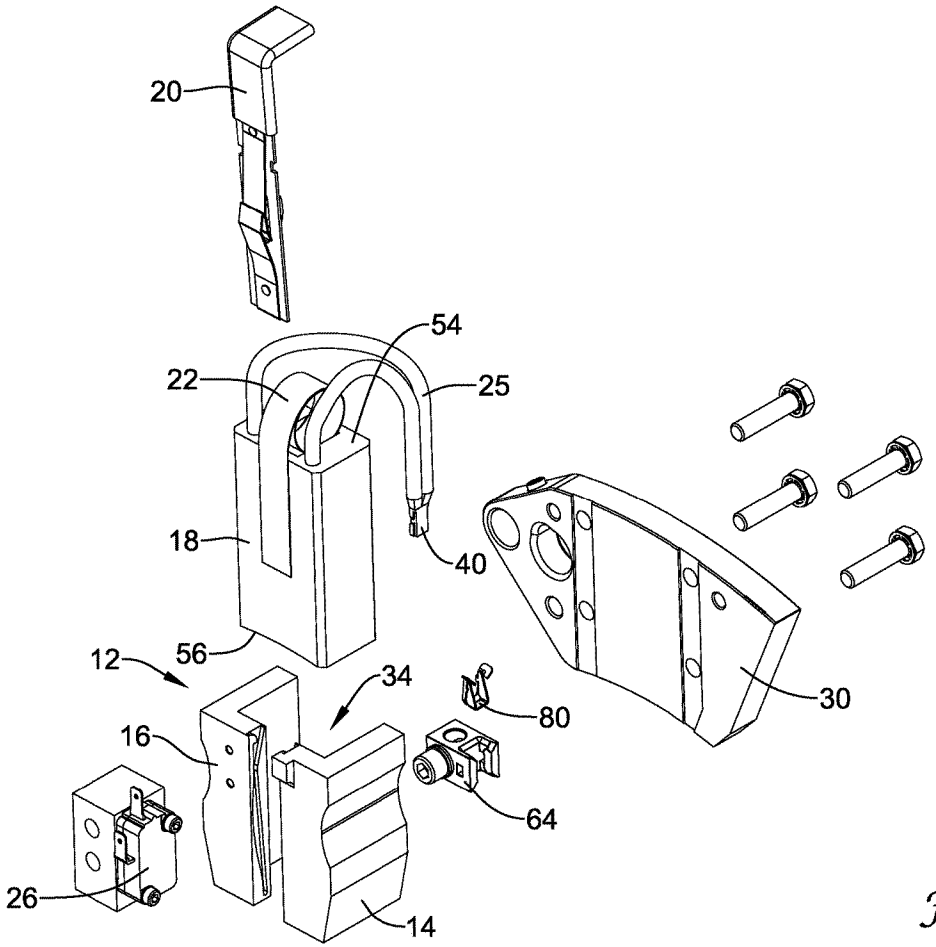
FIG. 2 is an exploded view of components of the brush holder assembly of FIG. 1.

Now referring to FIGS. 1 and 2, an illustrative brush holder assembly 10 is shown. The brush holder assembly 10 is shown assembled in FIG. 1, while FIG. 2 shows various components of the brush holder assembly 10 in an exploded view for illustrative purposes.

The brush holder assembly 10 may include a brush holder 12, such as a brush box, surrounding a brush 18 on several sides and including a plurality of guiding surfaces for guiding linear or longitudinal movement of the brush 18 therein into contact with a moving surface of an electrical device. For instance, in some embodiments the brush holder assembly 10 may substantially resemble a brush holder assembly as described in U.S. Pat. No. 7,034,430, entitled "Brush Holder Apparatus, Brush Assembly, and Method", which is herein incorporated by reference in its entirety. However, in other embodiments, the brush holder assembly 10 may include a brush holder, such as one or more posts for guiding linear or longitudinal movement of a brush into contact with a moving surface of an electrical device.

In some embodiments, the brush holder assembly 10, including the brush holder 12, may be of similar construction to the brush holder assemblies and brush holders described in U.S. Pat. No. 7,880,362, which is herein incorporated by reference in its entirety. For instance, one side of the brush holder 12 may include a slot extending from the top of the brush holder 12 toward the bottom of the brush holder 12. For example, the slot, which may be an opening, may extend from the top surface of the brush holder 12 to the bottom surface of the brush holder 12, dividing the brush holder 12 into two portions, a first portion 14 and a second portion 16. The first portion 14 of the brush holder 12 may face the brush 18 on one or more, or a plurality of sides of the brush 18 and/or the second portion 16 of the brush holder 12 may face the brush 18 on one or more, or a plurality of additional sides of the brush 18. As shown in FIGS. 1 and 2, the first portion 14 is a separate component from the second portion 16, together forming the brush holder 12. However, in other embodiments, the first portion 14 and the second portion 16 may be two portions of a unitary structure forming the brush holder 12. In some embodiments, the slot between the first portion 14 and the second portion 16 of the brush holder 12 may be a recess, depression, gap, space, opening or the like, of the brush holder 12.

The brush holder 12 may be secured to a stationary structure, such as a base member or yoke 30 of the electrical device, a portion thereof which is shown in FIGS. 1 and 2. In other embodiments, the stationary structure may be a stud, cross arm, adapter, or other member of the electrical device which remains stationary relative to the moving contact surface in sliding contact with the brush 18. For example, in some embodiments, the brush holder 12 may be rigidly mounted to another structure holding the brush holder 12 stationary, or mounted to another structure in any desired arrangement. For instance, in some embodiments the brush holder 12 may be bolted or welded to the stationary structure, such as bolted or welded to the base member or yoke 30. As shown in FIGS. 1 and 2, each of the first portion 14 and the second portion 16 of the brush holder 12 may be bolted to the base member or yoke 30 with a plurality of bolts or other fasteners. Additional brush holders, such as a second, third, fourth, fifth and/or sixth brush holder similar to the brush holder 12 disclosed herein, may be secured to the stationary structure, such as the base member or yoke 30 as desired. For example, first, second, third, fourth, fifth and/or sixth brush holders may be secured to the base member or yoke 30 radially around the moving contact surface of the electrical device.

The first portion 14 of the brush holder 12 may be spaced from the second portion 16 of the brush holder 12 along one side of the brush holder 12 such that the slot, which may be an opening between the first portion 14 and the second portion 16, is defined between an edge of the first portion 14 and an opposing edge of the second portion 16. In some embodiments, the edge of the first portion 14 may be parallel with the edge of the second portion 16.

Secured to the stationary structure, for example the base member or yoke 30, the brush holder 12 defines an interior opening 34 for receiving a brush 18 therein. As shown in the figures, the interior opening 34 may be collectively defined by a surface of the stationary structure (e.g., the base member or yoke 30), and interior surfaces of the first portion 14 and second portion 16 of the brush holder 12. In other words, the surface of the stationary structure may face a first side surface of the brush 18, while interior surfaces of the first portion 14 second portion 16 may face additional side surfaces of the brush 18. It is to be noted, however, that in other embodiments a surface of a portion of the brush holder 12 placed adjacent the surface of the stationary structure may partially define the interior opening 34 in place of or in addition to the surface of the stationary structure.

The brush holder assembly 10 is configured to place the bottom surface 56 of the brush 18 in contact with a conductive surface 32, such as a rotating surface of a collector ring, a slip ring, or a commutator, and conduct current therefrom. The brush 18 may be positioned in the interior opening 34 of the brush holder 12 and may extend from the lower edge of the brush holder 12 such that a wear surface of the brush 18 engages the conductive surface 32.

The brush 18 may include one or more, or a plurality of electrical leads 25 secured to the brush 18 providing a conductive pathway to or from the brush 18 for the flow of electricity. The electrical leads 25 have a first end secured to the brush 18 and a second end. A nugget 40 or other connector piece, such as a male connector, may be located at the second end of the electrical leads 25.

The brush holder assembly 10 may also include a brush wear indicator switch 26 configured to indicate when the brush 18 has worn beyond a threshold amount through frictional and electrical contact with the conductive surface 32. The switch 26 may generate a signal which indicates to an operator, monitor or other personnel that a brush 18 and/or other components may need to be replaced and/or maintenance may need to be performed on the brush holder assembly 10. The switch 26 may include one or more, or a plurality of electrical terminals providing an electrical pathway for carrying an electrical current to and/or from the switch 26, to generate an electrical signal.

Also illustrated in FIGS. 1 and 2 is a brush spring 22, such as a constant force spring, which provides tension to the brush 18 to bias the brush 18 toward and in contact with the conductive surface 32. For instance, the coiled portion of the spring 22 may be in contact with the top surface 54 of the brush 18 and press against the top surface 54 of the brush 18, while a longitudinally extending portion (e.g., elongated portion) of the spring 22 may extend along and/or contact a side surface of the brush 18.

The spring 22 may be coupled to a spring clip 20, which may be removable from the brush holder 12 of the brush holder assembly 10. In some instances, the spring 22 may be removably coupled to the spring clip 20, such that the spring 22 may be readily removed from the spring clip 20 and replaced with a new spring 22 as desired. For instance, it may be desirable to replace the spring 22 with a new spring 22 each time a new brush 18 is installed in the brush holder assembly 10. In some embodiments, the spring 22 and the spring clip 20 may be configured such that replacement of the spring 22 may be performed without the need for additional tools and/or extensive time requirements. In some embodiments, the spring 22 may be removably coupled to the spring clip 20 without the use of a rivet, weld, solder or other similar fastening means. In some embodiments the spring 22 may be removed from the spring clip 20 without removing a bolt, screw of other threaded fastener. Thus, in some embodiments, the spring 22 may be slipped or slid on and off, or otherwise disconnected from the spring clip 20 without the need of removing a bolt, screw, rivet, weld, solder, or other fastening means. In other embodiments, the spring 22 may be coupled to the spring clip 20 with a rivet, weld, solder, bolt, screw or other fastening mechanism.

The spring clip 20 may be located between the first portion 14 and the second portion 16 of the brush holder 12 such that the spring clip 20 spans the slot between the edge of the first portion 14 and the edge of the second portion 16. For example, opposing longitudinal edge portions of the spring clip 20 may be slidably disposed in opposing channels or grooves defined in the first and second portions 14, 16 of the brush holder 12.

The brush holder assembly 10 also includes a quick disconnect assembly 50 for quickly disconnecting the brush 18 and electrical leads 25 from a remaining component of the brush holder assembly 10 to facilitate brush removal and replacement. For example, the quick disconnect assembly 50 may include a receptacle 60 having a cavity 62 for removably receiving and an end of the electrical lead 25, such as the nugget 40, and a resilient clip 80. In some embodiments the receptacle 60 may be a body 64 having the cavity 62 formed therein, which may be a separate component bolted, or otherwise secured to either the stationary member or yoke 30 or the brush holder 12, or other component of the brush holder assembly 10. In other embodiments, the receptacle 60 may be integrally formed in either the stationary member or yoke 30 or the brush holder 12, or other component of the brush holder assembly 10. In other words, the stationary member or yoke 30 or the brush holder 12 may include the cavity 62 formed therein, for removably receiving an end of the electrical lead 25, such as the nugget 40, and the resilient clip 80.

It is noted that although the quick disconnect assembly 50 is shown for use in an electrical connection of a brush holder assembly 10, the quick disconnect assembly 50 may be used in a variety of other electrical applications for quickly disconnecting an electrical connection between a first electrically conductive member and a second electrically conductive member to disrupt an electrical pathway therebetween.

Figure 3:
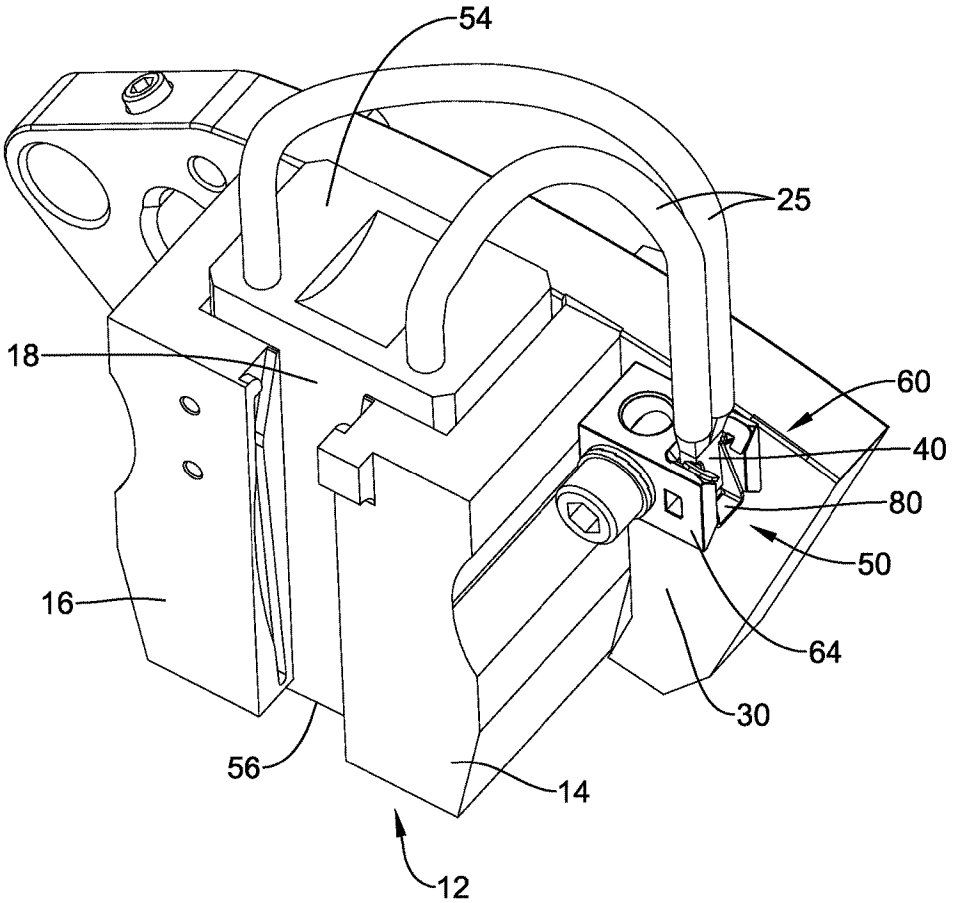
FIG. 3 is a perspective view of components of an electrically conductive pathway of the brush holder assembly of FIG. 1 including a quick disconnect assembly, with some components of the brush holder assembly removed for clarity.

FIG. 3 illustrates an assembly of the brush holder assembly 10 for providing an electrical current pathway through the brush holder assembly 10 from the conductive surface 32 to the base member or yoke 30. The quick disconnect assembly 50, provided in the electrical current pathway, may facilitate replacing the brush 18 by providing an electrical connection between the electrical lead 25 coming from the brush 18 and a conductive surface (e.g., the base member or yoke 30) in the electrical current pathway that may be selectively coupled and decoupled as desired.

The electrical current pathway may be provided from the conductive surface 32, through the brush 18, through the electrical lead 25 extending from the brush 18 to the nugget 40, from a surface of the nugget 40 to a surface of the receptacle 60, and from the receptacle 60 to a conductive member, such as the base member or yoke 30.

Figure 4:
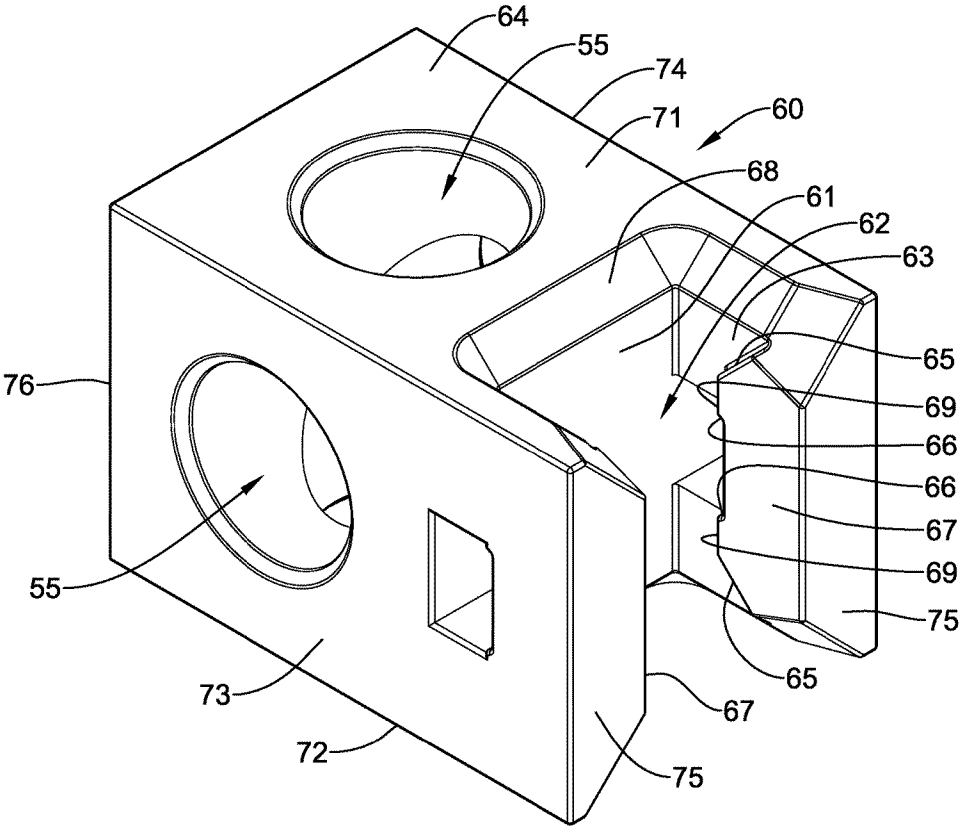
FIG. 4 is a perspective view of an exemplary receptacle of a quick disconnect assembly of the brush holder assembly of FIG. 1.

One embodiment of the receptacle 60 may be further described with reference to FIGS. 4-6. The receptacle 60 may be formed of a body 64, such as a rigid metal block, having a first side 71, a second side 72 opposite the first side 71, a third side 73, a fourth side 74 opposite the third side 73, a first end 75 and a second end 76 opposite the first end 75. The body 64, in the form of a rigid metal block, may be an inert structure which does not flex, bend, deform, or otherwise change shape during normal operation. The body 64 may include a bore 55 extending through the body 64 from the first side 71 to the second side 72 and/or a bore 55 extending through the body 64 from the third side 73 to the fourth side 74.

The body 64 may be formed of a conductive material, including, but not limited to, aluminum, beryllium, brass, chromium, copper, gold, iron, nickel, palladium, platinum, silver, steel, tin, tungsten, or alloys thereof, or the like. In some embodiments, the body 64 may be copper or a copper alloy, for example, a beryllium copper material, or steel, for example a stainless steel alloy. Conductive materials are considered to be materials which readily pass an electrical current therethrough.

In some embodiments, the body 64 may be symmetrical about two perpendicular planes of symmetry, i.e., a first plane parallel to the first and second sides 71, 72 and a second plane parallel to the third and fourth sides 73, 74. The body 64 may be bolted to a conductive surface by passing a bolt (See FIG. 3) through a bore 55. Thus, depending on the desired orientation of the body 64 the bolt may be passed through either of the bores 55. Accordingly, as certain features of the body 64 are described, it should be noted that although not necessarily shown in the figures, these features may additionally be found on the opposing side of the planes of symmetry of the body 64.

The cavity 62 in the body 64 may be configured to removably receive the nugget 40 and the resilient clip 80 therein to complete an electrical pathway from the nugget 40 to the receptacle 60. The cavity 62 may extend from the first side 71 of the body 64 to the second side 72 of the body 64. As the body 64 may be symmetrical about two perpendicular planes of symmetry, the cavity 62 may be configured such that the nugget 40 and the resilient clip 80 may be inserted into the cavity 62 of the body 64 from either the first side 71 of the body 64 or the second side 72 of the body 64. The cavity 62 may include a beveled opening 68 opening into the cavity 62 from the first side 71 and/or a beveled opening 68 opening into the cavity 62 from the second side 72 to facilitate insertion of the nugget 40 and resilient clip 80.

The cavity 62 may be defined by a plurality of walls or surfaces, including a rear surface 61, first and second side surfaces 63, and third and fourth side surfaces 67 nonplanar with the first and second side surfaces 63. In some embodiments, the cavity 62 may open out to the first end 75 of the body 64 in which case the third and fourth side surfaces 67 may extend to and intersect the first end 75 of the body 64. However, in other embodiments, the cavity 62 may be fully enclosed at the first end 75.

Figure 5:
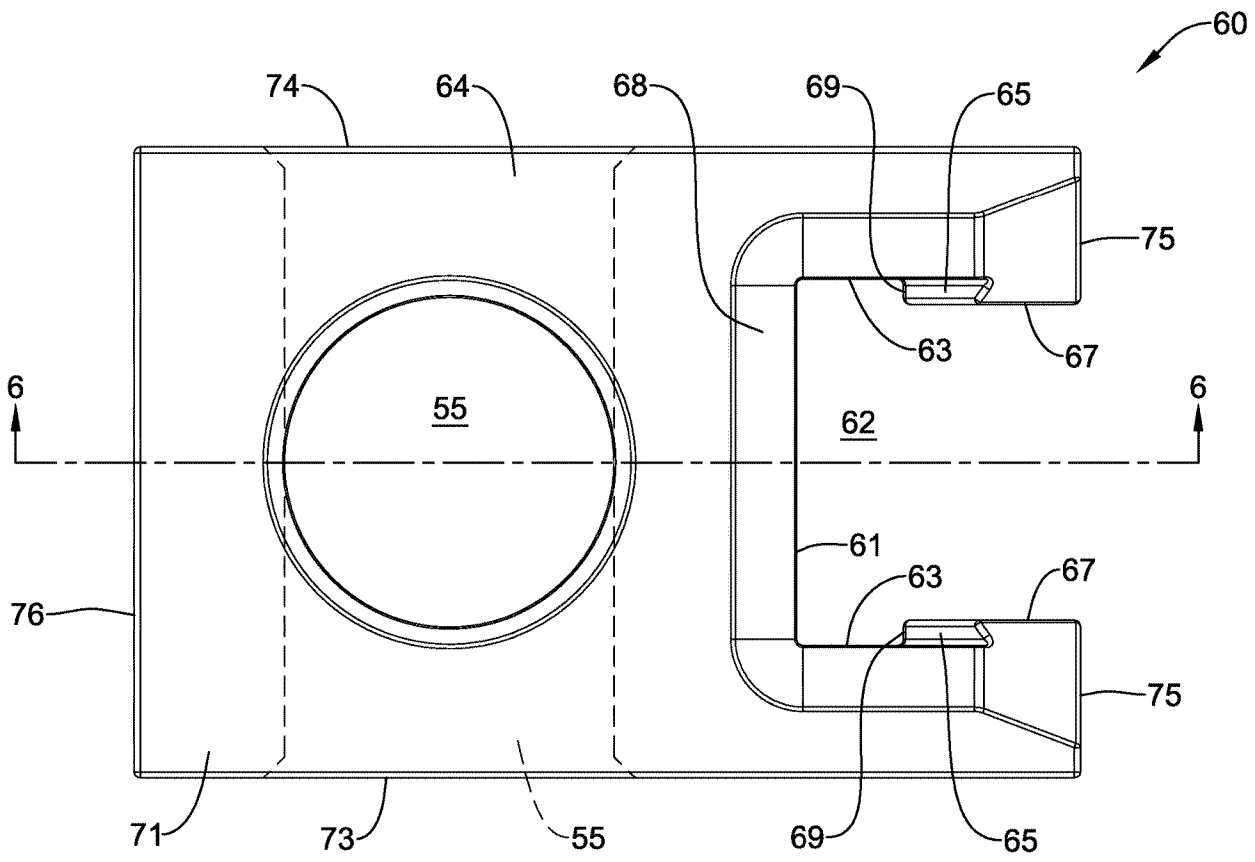
FIG. 5 is a top view of the receptacle of FIG. 4.
Figure 6:
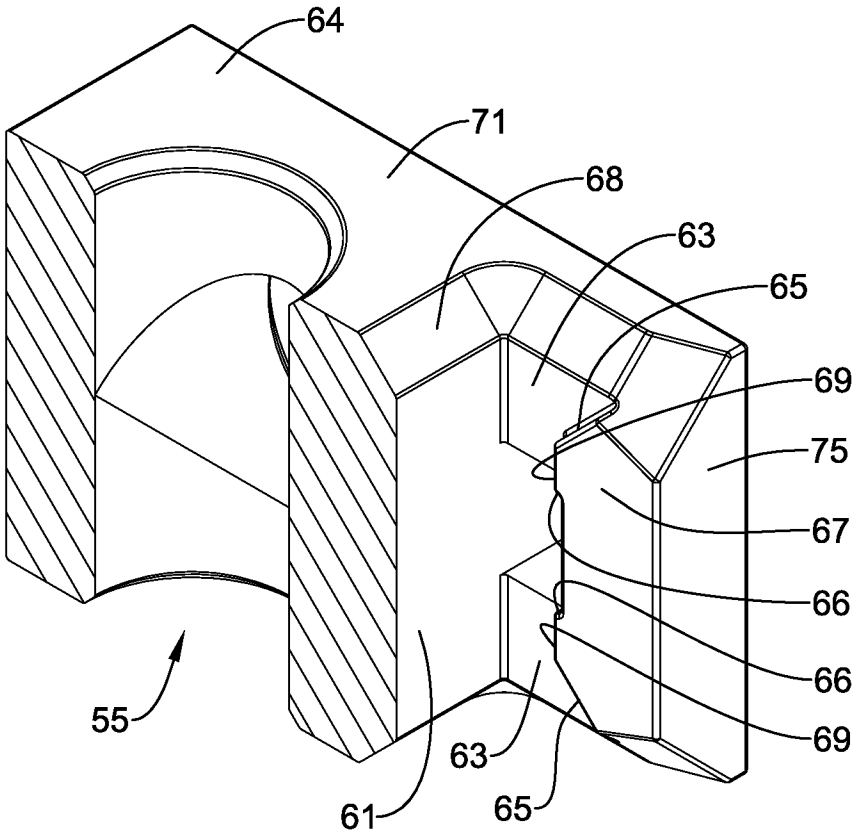
FIG. 6 is a cross-sectional view of the receptacle of FIG. 4.

As shown in FIG. 5, the first and second side surfaces 63 may be perpendicular to the rear surface 61 and/or the third and fourth side surfaces 67 may be perpendicular to the rear surface 61. Accordingly, the first and second side surfaces 63 may be parallel to, but offset from the third and fourth side surfaces 67, forming a jog 69 in the sides of the cavity 62. Thus, the distance across the cavity 62 between the first and second side surfaces 63 may be greater than the distance across the cavity 62 between the third and fourth side surfaces 67, providing a transition at the jog 69.

The cavity 62 may include sloped surfaces 65 at the jog 69 to facilitate entry into the cavity 62. Furthermore, the cavity 62 may include recesses, edges or lips 66 formed in the jog 69 of the sides of the cavity 62 for providing an interlocking geometry with the resilient clip 80.

Figure 7A:
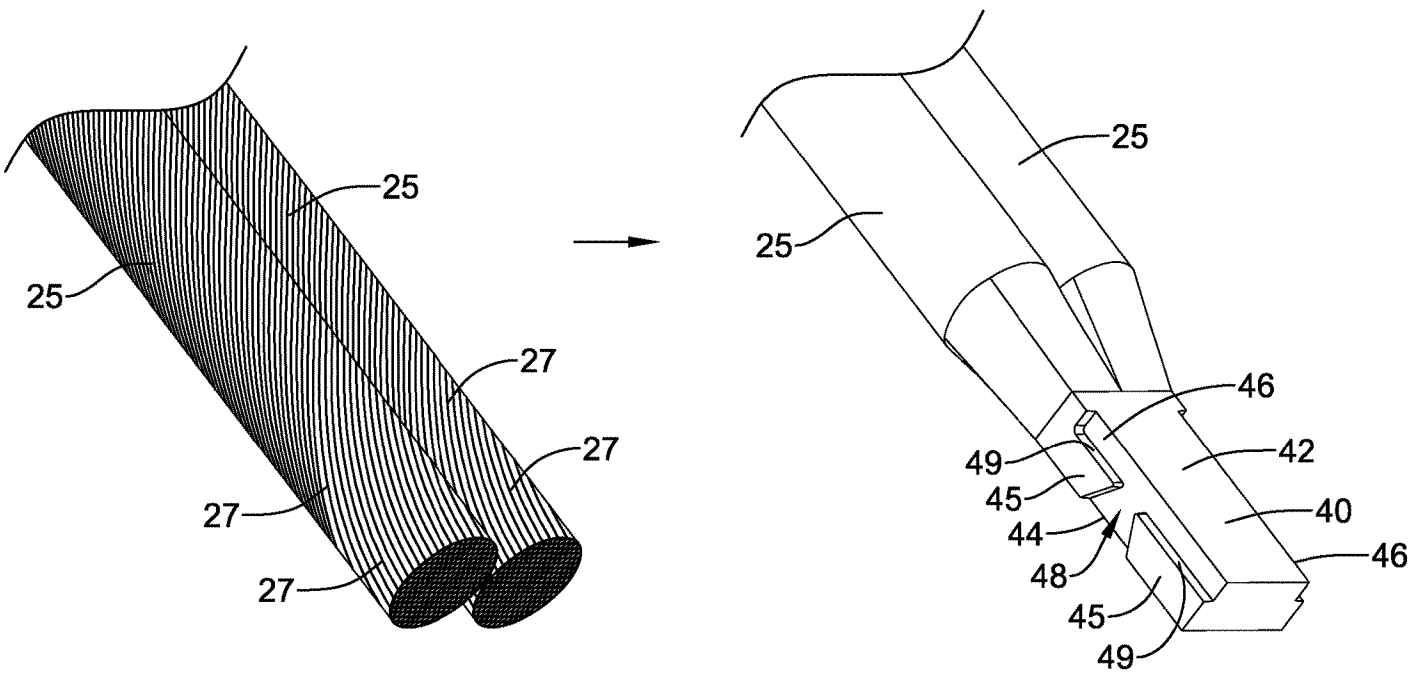
FIG. 7A illustrates an exemplary method of forming a nugget on a pair of electrical leads.

FIG. 7A illustrates one possible manufacturing process for providing a nugget 40 on the end of the electrical leads 25. In some instances, the nugget 40 may be formed of a plurality of wire strands 27 of the electrical leads 25. For instance, the electrical leads 25 may be of multifilament construction and the nugget 40 may be formed by ultrasonically welding together a plurality of wire strands or filaments 27 of the electrical leads 25 into a formed shape. For example, the end portions of the electrical leads 25 may be placed in a fixture and simultaneously subjected to high-frequency ultrasonic acoustic vibrations (e.g., 20,000 Hz-40,000 Hz) and pressure for a duration of time to ultrasonically weld the wire strands or filaments 27 into the formed shape of the nugget 40 without reaching the melt temperature of the metal forming the wire strands or filaments 27. The ultrasonic vibrations and pressure cause surface oxides and contaminates on the surfaces of the filaments 27 to break up and disperse to provide clean base metal surfaces in which diffusion bonding occurs (i.e., atoms of adjacent filaments 27 diffuse across the interface between filaments 27, forming a metallurgical bond). The applied pressure may press the filaments 27 into the desired formed shape.

Thus, the resultant nugget 40 may be a monolithic structure of the electrical leads 25, integrally formed from the end portions of the filaments 27 of the electrical leads 25. In some instances, the nugget 40 may have a rectangular block shape having flat front and rear surfaces 42, 44. The formed nugget 40 may also include an interlocking structure to mate with and interlock with the resilient clip 80. For example, the nugget 40 may be formed with projecting portions 45 formed in the side surfaces 46 of the nugget 40 forming edges 49 and notches 48. Notches 48 may be any desired shape, but in some instances the notches 48 may be wedge or dovetail shaped having a wider portion proximate the rear surface 44 and a narrower portion proximate the front surface 42. The edges 49 may define a stepped transition of the front surface 42 and side surfaces 46. Thus, the edges 49 may be considered a stepped portion of the front surface 42.

In other embodiments, the electrical leads 25 may be of monofilament construction and the nugget 40 may be formed by ultrasonically welding together the monofilaments of the electrical leads 25 into a formed shape, or forming the end portion of a monofilament of an electrical lead 25 into a formed shape. Thus, the resultant nugget 40 may be a monolithic structure of the electrical lead(s) 25, integrally formed from the end portion(s) of the electrical lead(s) 25.

The nugget 40, as well as the electrical leads 25 from which the nugget 40 is formed, may be formed of a conductive material, including, but not limited to those materials listed above. In other embodiments, the nugget 40 may be separately formed and subsequently secured to the electrical leads 25 in a conventional manner, such as crimping, welding, soldering or brazing. In such instances, the nugget 40 may similarly be formed of a conductive material.

Figure 7B:
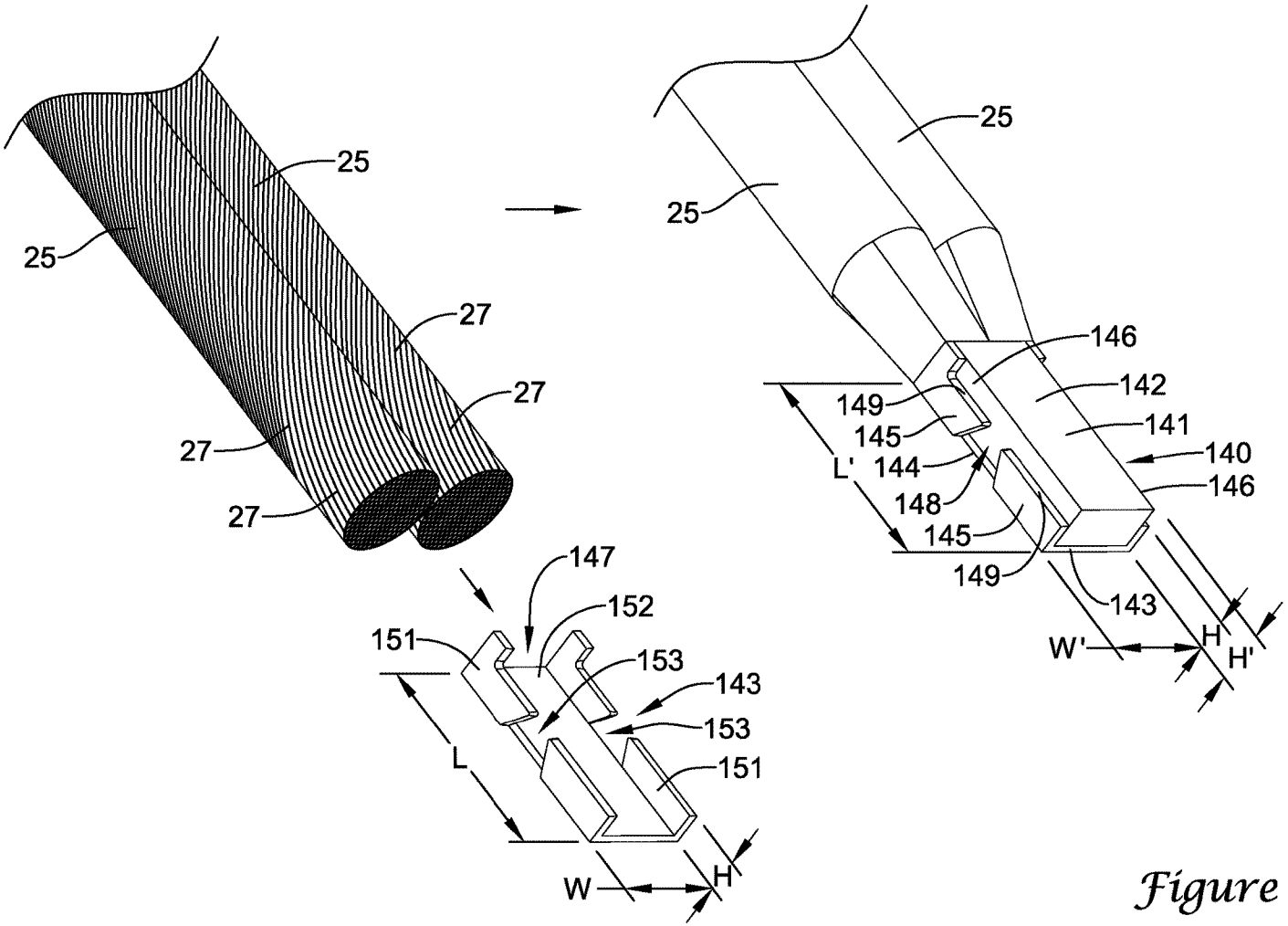
FIG. 7B illustrates another exemplary method of forming a nugget on a pair of electrical leads.
Figure 8:
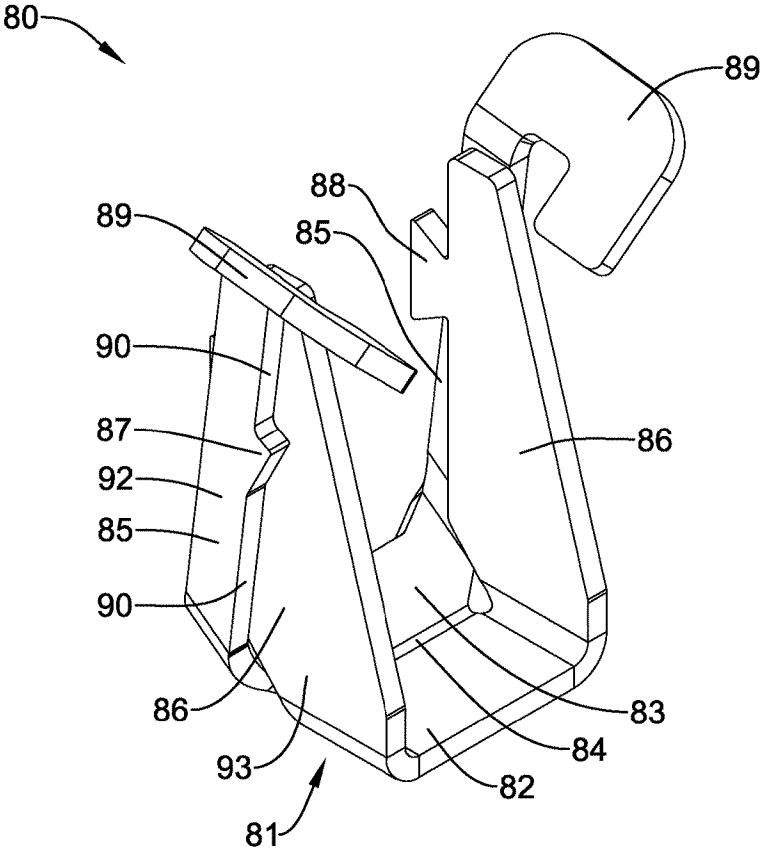
FIG. 8 is a perspective view from the front of an exemplary resilient clip of a quick disconnect assembly of the brush holder assembly of FIG. 1.
Figure 9:
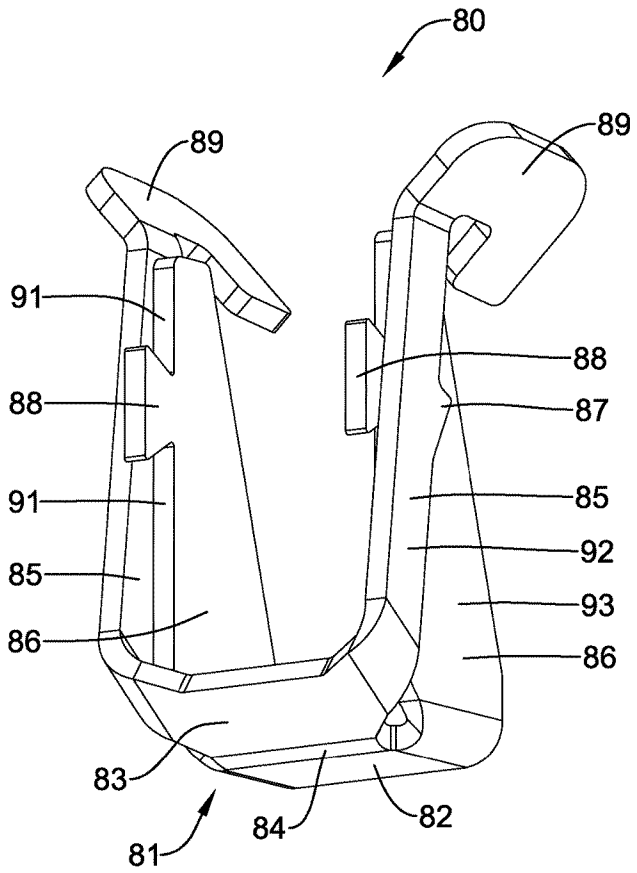
FIG. 9 is another perspective view from the rear of the resilient clip of FIG. 8.
Figure 10:
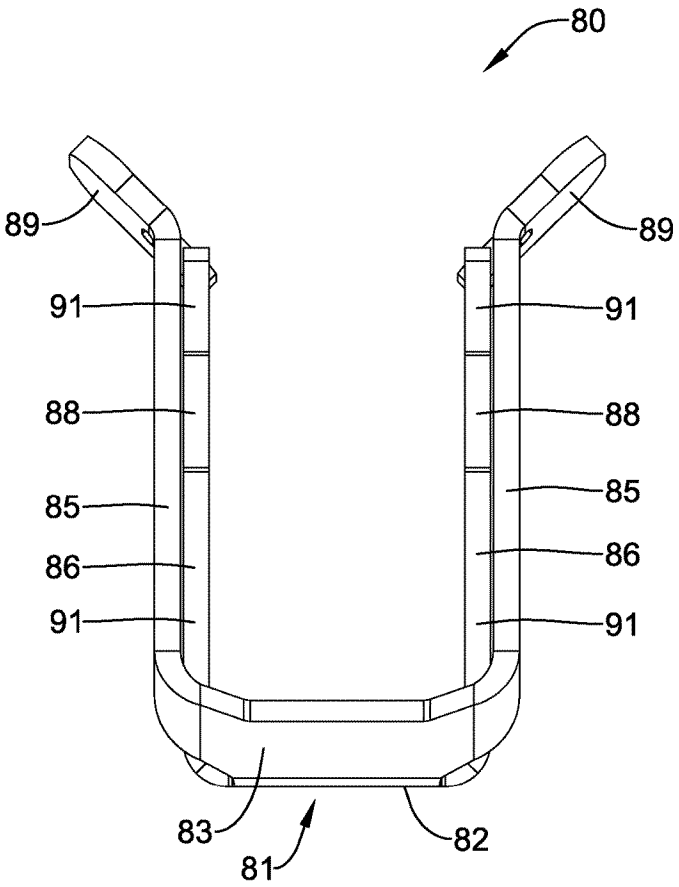
FIG. 10 is a rear view of the resilient clip of FIG. 8.
Figure 11:
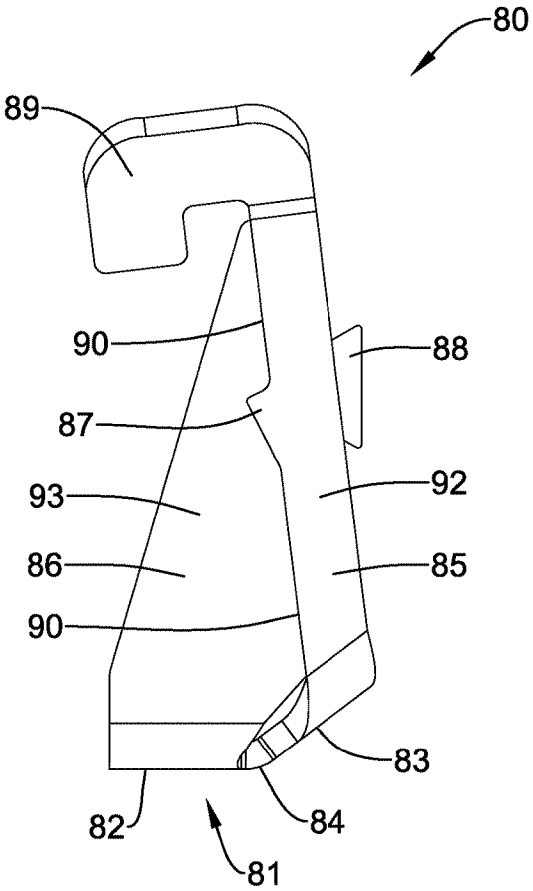
FIG. 11 is a side view of the resilient clip of FIG. 8.
Figure 12:
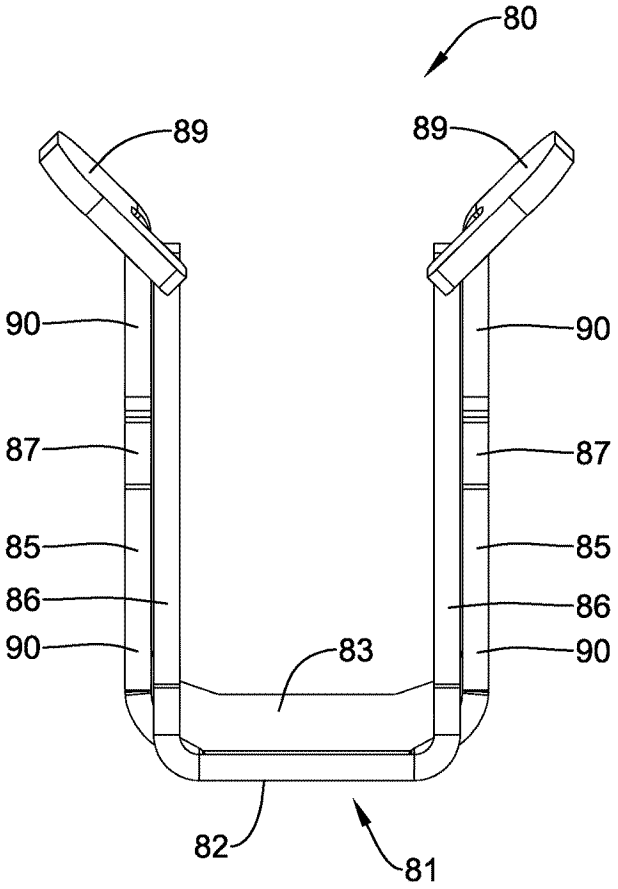
FIG. 12 is a front view of the resilient clip of FIG. 8.

FIG. 7B illustrates another possible manufacturing process for providing a nugget 140 on the end of the electrical leads 25. In this embodiment, the nugget 140 may be formed by securing the end portion of the electrical lead(s) 25 into a channel 147 of a preformed sleeve 143. The sleeve 143 may be stamped or otherwise formed from a thin sheet of metal into a formed shape having a back portion 152 and opposing side portions or wings 151 extending from the back portion 152 to form a U-shaped member with the channel 147 defined between the opposing side portions 151. The side portions 151 may include cut outs 153, which when the electrical leads 25 are secured to the sleeve 143, may define the notches 148. The sleeve 143 may be preformed to have a length L, width W, and height H of controlled predetermined dimensions sized and configured to be inserted into a cavity of a receptacle having known dimensions sized and configured to accommodate the dimensions of the sleeve 143.

To form the nugget 140, the end portions of the electrical leads 25 may be inserted into the channel 147 of the sleeve 143 and secured thereto, such as by crimping, welding, soldering or brazing without changing the dimensions of the sleeve 143. In some instances, the electrical leads 25 may be welded in the channel 147 using an ultrasonic welding technique as described above.

In some instances, the formed nugget 140 may have a rectangular block shape having flat front and rear surfaces 142, 144. The formed nugget 140, similar to the nugget 40, may also include an interlocking structure to mate with and interlock with the resilient clip 80. For example, the nugget 140 may be formed with projecting portions 145 formed in the side surfaces 146 of the nugget 140 forming edges 149 and notches 148. Notches 148 may be any desired shape, but in some instances the notches 148 may be wedge or dovetail shaped having a wider portion proximate the rear surface 144 and a narrower portion proximate the front surface 142. The edges 149 may define a stepped transition of the front surface 142 and side surfaces 146. Thus, the edges 149 may be considered a stepped portion of the front surface 142.

Accordingly, the side portions 151 of the sleeve 143 may define the projecting portions 145, with the cut outs 153 defining the notches 148 in the sides of the nugget 140, while the back portion 152 of the sleeve 143 may define the rear surface 144 of the formed nugget 140. When secured in the channel 147, the end portion of the lead(s) 25 form a core 141 of the nugget 140, surrounded on three sides by the sleeve 143 (i.e. rear and opposing sides of the core 141). Thus, the front surface 142 of the nugget 140 (with the exception of the edges 149) may be defined by the core 141.

The nugget 140 may have a length L' substantially equal to the length L of the sleeve 143, and a width W' substantially equal to the width W of the sleeve 143. Furthermore, the height H of the edges 149 from the rear surface 144 may be predetermined and controlled by the height H of the side portions 151 of the sleeve 143. Thus, the length L' of the nugget 140, the width W' of the nugget 140, and height H of the edges 149 may be dictated and determined by the manufactured dimensions of the sleeve 143, regardless of the gauge, size, quantity (i.e., volume) of the leads 25 positioned in the channel 147. Accordingly, the only dimension of the formed nugget 140 which may be varied based on the gauge, size, quantity (i.e., volume) of the leads 25 positioned in the channel 147 may be the height H' of the nugget 140 from the rear surface 144 to the front surface 142. Thus, the height H' of the nugget 140 may vary based on the gauge, size, and/or quantity (i.e., volume) of the leads 25 positioned in the channel 147 without altering the other dimensions of the nugget 140 predetermined to mate with a resilient clip 80 of predetermined size and shape, and in combination with the resilient clip 80 of predetermined size and shape may be insertable into a cavity 62 of a receptacle 60 having known dimensions.

The side of the core 141 opposite the base portion 152 of the sleeve 143 may extend to any height H', and need not be precisely controlled, as this portion of the core 141 does not engage another component. In other words, the portion of the core 141 extending out of the channel 147 may fit between the inner arms 86 of the resilient clip 80, with the inner arms 86 contacting the edges 149 defined by the sleeve 143.

Accordingly, a single sized/shaped (e.g., universal) resilient clip 80 and single sized/shaped (e.g., universal) cavity 62 of a receptacle 60 may be used regardless of the gauge, size, quantity (i.e., volume) of the leads 25 to which the sleeve 143 is secured to as the dimensions of the sleeve 143 may dictate or control the size of the formed nugget 140 for insertion into the cavity 62. Thus, multiple sizes of nuggets 140 may not be needed to accommodate a variety of gauges, sizes and/or quantities of leads 25, instead a single size of sleeve 143 and single size of resilient clip 80 may be used with a single size of cavity 62 of a receptacle 60 to provide the quick disconnect assembly 50.

In some instances, it may be desirable to plate the rear surface 144 of the nugget 140 (i.e., the rear surface of the back portion 152) with a thin layer of conductive material to enhance the electrical conductivity of the nugget 140. For example, the rear surface 144 may include a thin layer of silver plating, or other conductive material in some instances.

FIGS. 8-12 further illustrate features of the resilient clip 80. The resilient clip 80 may be formed of a resilient material giving the resilient clip 80 a degree of springiness (i.e., elastic flexibility) such that the resilient clip 80 can undergo elastic deformation or deflection with an applied force to a non-equilibrium position, yet return to its equilibrium position when the applied force is removed. For example, the resilient clip 80 may be formed of aluminum, beryllium, brass, chromium, copper, gold, iron, nickel, palladium, platinum, silver, steel, tin, tungsten, or alloys thereof, or the like. In some embodiments, the resilient clip 80 may be copper or a copper alloy, for example, a beryllium copper material or a spring steel, such as 17-7 stainless steel. In some embodiments, the resilient clip 80 need not be conductive. For example, in some instances, the resilient clip 80 may be formed of a polymeric material, or a composite of a polymeric material and a metallic material. For instance, the resilient clip 80 may include a polymeric material covering or encapsulating a metallic core, such as a metal wire or plate embedded in a polymeric material covering.

The resilient clip 80 may include a base 81 having a front portion 82 at an oblique angle to a rear portion 83 with a living hinge 84 between the front portion 82 and the rear portion 83 to provide a flexing region between the front portion 82 and the rear portion of the base 81.

The resilient clip 80 may include a pair of outer arms 85 extending from the rear portion 83 and a pair of inner arms 86 extending from the front portion 82. The inner arms 86 may be positioned between the outer arms 85. In other words, the inner arms 86 may be positioned a first distance apart, while the outer arms 85 may be positioned a second distance apart greater than the first distance between the inner arms 86. Thus, the outer arms 85 may overlap with the inner arms 86 when viewed from the side.

The outer arms 85 may include wings 89 at the upper end of the outer arms 85 to help stabilize the resilient clip 80 and appropriately orient the resilient clip 80 in the cavity 62. For example, the wings 89 may be configured to come into contact with the beveled opening 68 of the cavity 62 when the resilient clip 80 is properly positioned in the cavity 62.

The outer arms 85 may include frontwardly extending tabs 87 extending from a front edge 90 of the outer arms 85. Additionally, the inner arms 86 may include rearwardly extending tabs 88 extending from a rear edge 91 of the inner arms 86. As will be discussed further herein, the frontwardly extending tabs 87 may be configured to interlock with mating geometry (e.g., the recesses or lips 66) in the cavity 62 of the receptacle 60. Likewise, the rearwardly extending tabs 88 may be configured to interlock with mating geometry (e.g., the notches 48) of the nugget 40.

Figure 13:
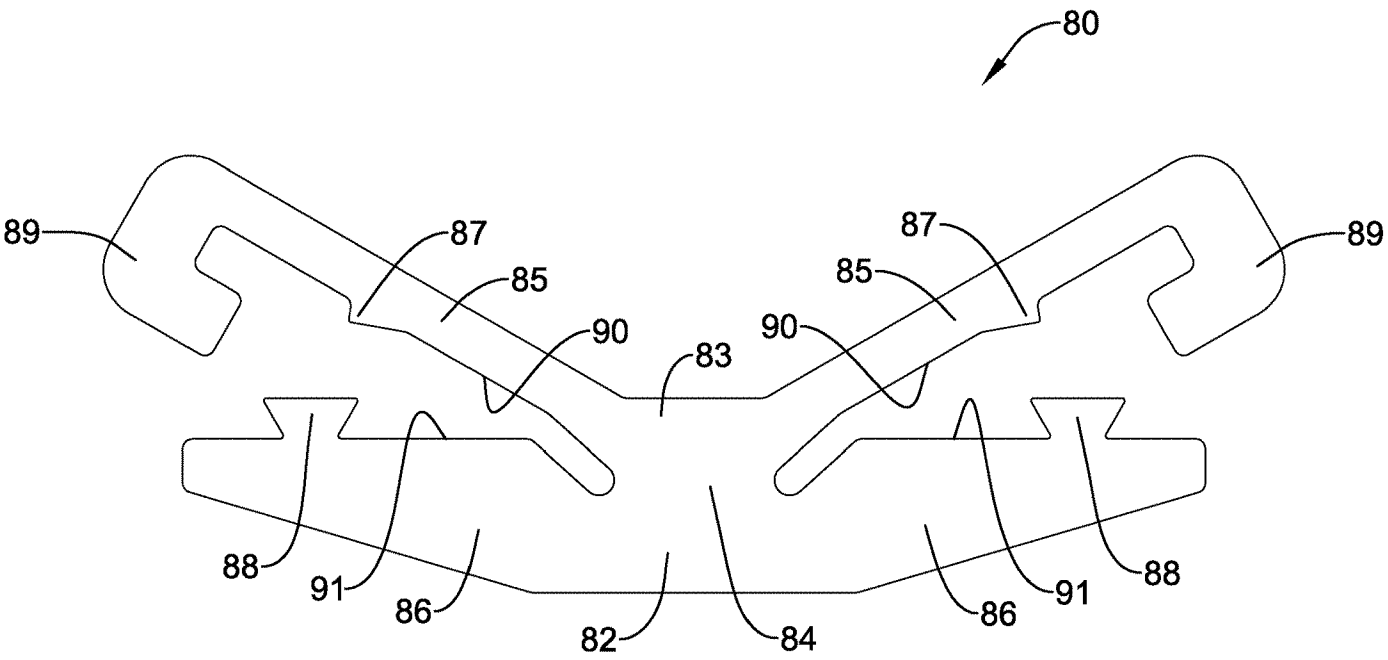
FIG. 13 illustrates the resilient clip of FIG. 8 prior to bending the resilient clip into its final shape.

In some embodiments the resilient clip 80 may be formed from a piece of sheet metal, such as a sheet of stainless steel. However, in other embodiments, the resilient clip 80 may be formed of a polymeric material, and thus need not be electrically conductive. As shown in FIG. 13, the resilient clip 80 may initially be cut or stamped in a flattened out state from a sheet of metal or otherwise removed from a sheet of metal. The resilient clip 80 may subsequently undergo additional processing to form the resilient clip 80 into its final formed shape. For example, the outer arms 85 and inner arms 86 may be bent upward relative to the base 81, forming a generally U-shaped structure. Additionally, the front portion 82 of the base 81 may be bent relative to the rear portion 83 of the base 81 along the living hinge 84 such that the front portion 82 is at an oblique angle to the rear portion 83. The wings 89 may also be bent outward from the outer arms 85. Although the resilient clip 80 may be formed of a single piece of material formed from a piece of sheet metal, in other embodiments the resilient clip 80 may be formed of multiple pieces, welded, soldered, or brazed together, or otherwise united to form the resilient clip 80. In instances in which the resilient clip 80 is formed of a polymer material, the resilient clip 80 may be formed in a molding process, such as injection molding.

Figure 14:
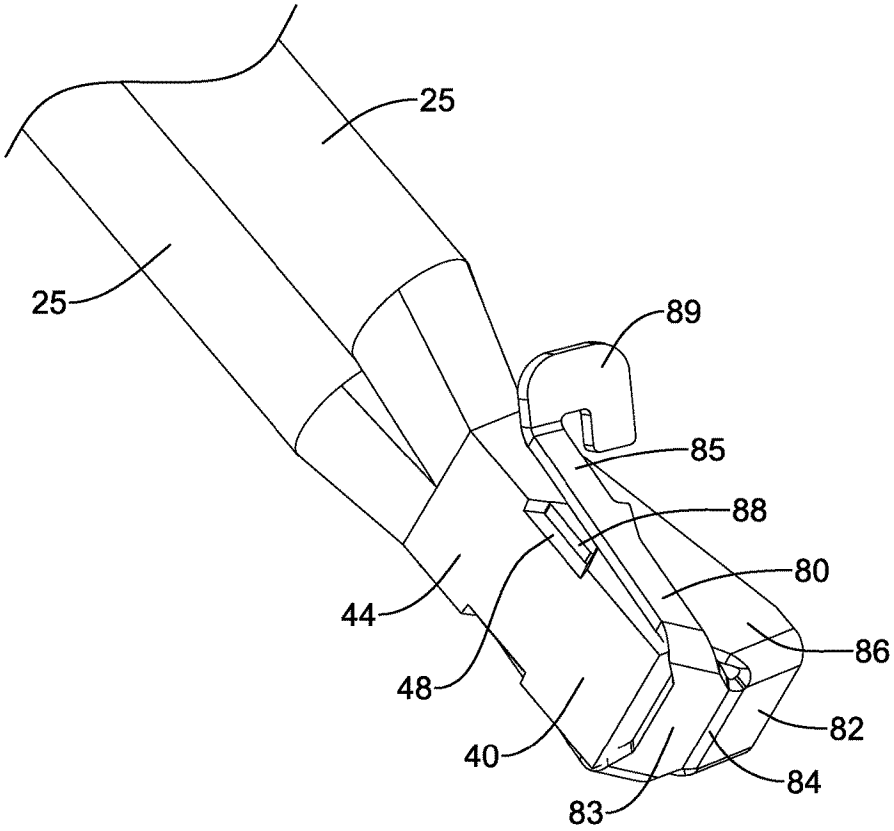
FIG. 14 is a perspective view of the resilient clip coupled to the nugget of an electrical lead.
Figure 15:
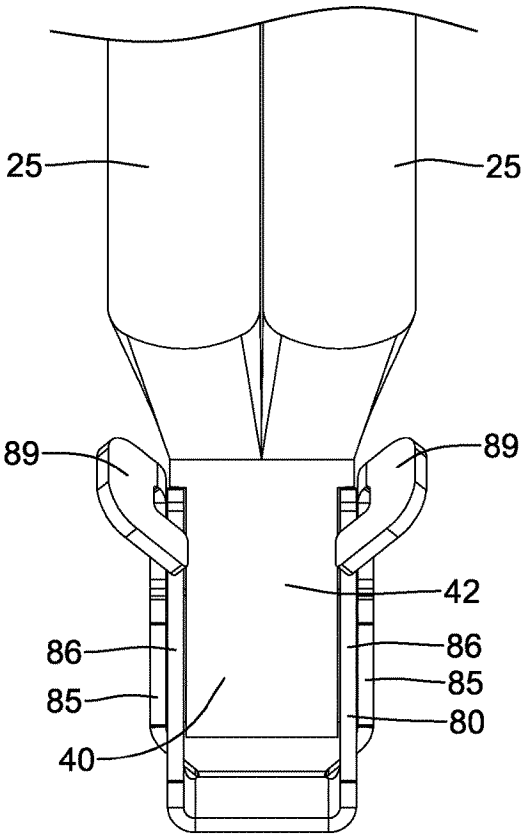
FIG. 15 is another perspective view of the resilient clip coupled to the nugget of an electrical lead.

As shown in FIGS. 14-15, the resilient clip 80 may be removably coupled to the nugget 40, with the rearwardly extending tabs 88 extending into and interlocking with the notches 48 of the nugget 40. The notches 48 and tabs 88 may be complementarily formed such that the tabs 88 may not be removed from the notches 48 in a direction toward the front surface 42 of the nugget 40. For example, the notches 48 and tabs 88 may be wedge shaped, such that a portion of a tab 88 is sized larger than a portion of a notch 48.

When coupled to the nugget 40, the rear edges 91 of the inner arms 86 may face and contact the edges 49 of the projecting portions 45 of the nugget 40 while the outer arms 85 are positioned outward of the projecting portions 45 and facing the side surfaces 46 of the nugget 40. Furthermore, the end of the nugget 40 may contact and press against the rear portion 83 of the base 81 of the resilient clip 80. When coupled to the nugget 40, no portion of the resilient clip 80 may extend rearward of the rear surface 44 of the nugget 40. In other words, the entire resilient clip 80 may be positioned forwardly of the rear surface 44 toward the front surface 42 of the nugget 40 when coupled thereto. Such a configuration may resiliently couple the resilient clip 80 to the nugget 40 and maintain a residual force between the resilient clip 80 and the nugget 40.

Figure 16:
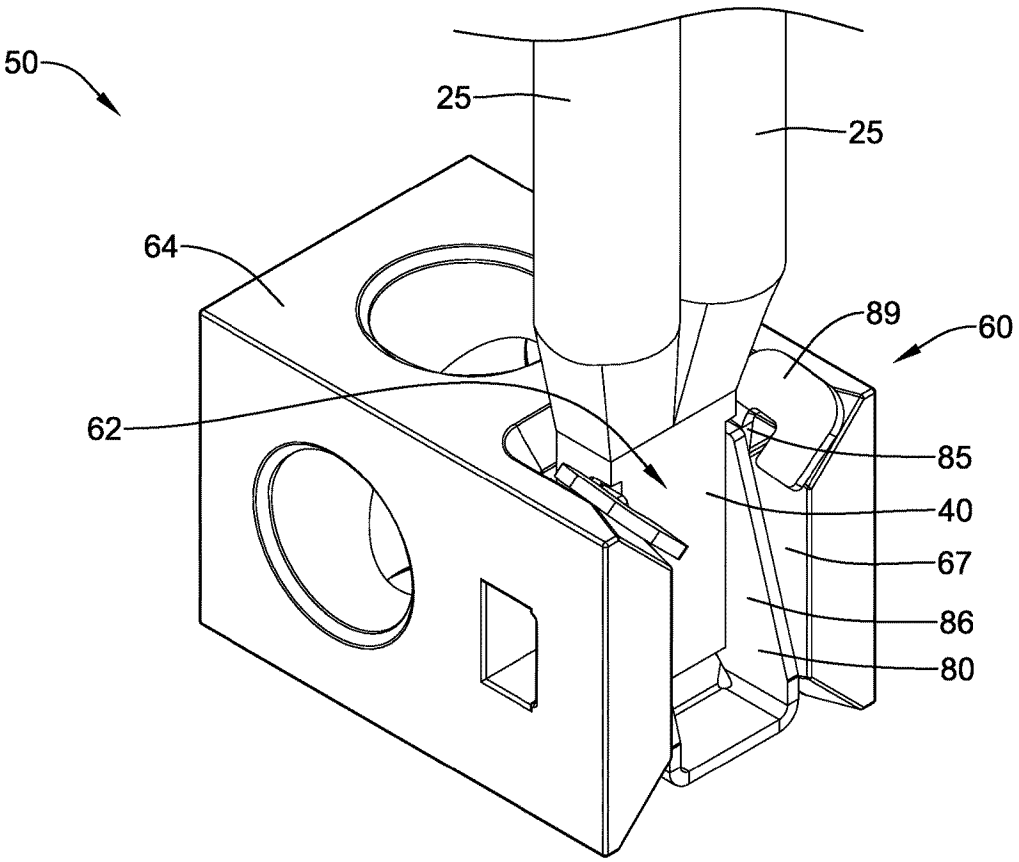
FIG. 16 is a perspective view of the components of a quick disconnect assembly coupled together.

With the resilient clip 80 coupled to the nugget 40, the combination of the resilient clip 80 and nugget 40 may be inserted into the cavity 62 of the receptacle 60 (e.g., the body 64). As shown in FIG. 16, the resilient clip 80 may be sized and shaped such that the outer arms 85 fit in the enlarged portion of the cavity 62 defined between the first and second side surfaces 63 while the inner arms 86 fit in the smaller portion of the cavity 62 defined between the third and fourth side surfaces 67. Thus, the outer arms 85 may be interposed between the side surfaces 46 of the nugget 40 and the first and second side surfaces 63 of the cavity 62, while the inner arms 86 may extend from the edges 49 formed in the front surface 42 of the nugget 40 into the region of the cavity 62 defined between the third and fourth side surfaces 67. Accordingly, the outer surfaces 92 of the outer arms 85 may face and/or contact the first and second side surfaces 63 of the cavity 62 and the outer surfaces 93 of the inner arms 86 may face and/or contact the third and fourth side surfaces 67 of the cavity 62. When properly positioned in the cavity 62, the wings 89 may come into contact with the beveled opening 68 of the cavity 62 to prevent further advancement of the resilient clip 80 and nugget 40 into the cavity 62.

As noted previously, the body 64, and thus the cavity 62 may be symmetrical such that the nugget 40 and the resilient clip 80 may be inserted into the cavity 62 of the body 64 from either the first side 71 of the body 64 or the second side 72 of the body 64 depending on the desired orientation of the body 64 mounted to the base member or yoke 30, brush holder 12, or other component of the brush holder assembly 10.

Figure 17:
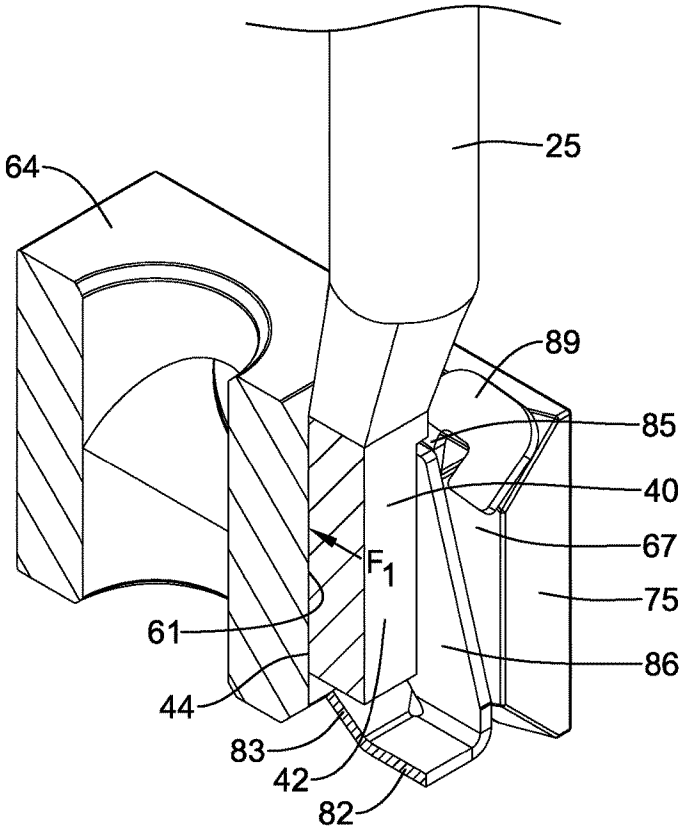
FIG. 17 is a cross-sectional view of the quick disconnect assembly of FIG. 16 taken along a first plane.
Figure 18:
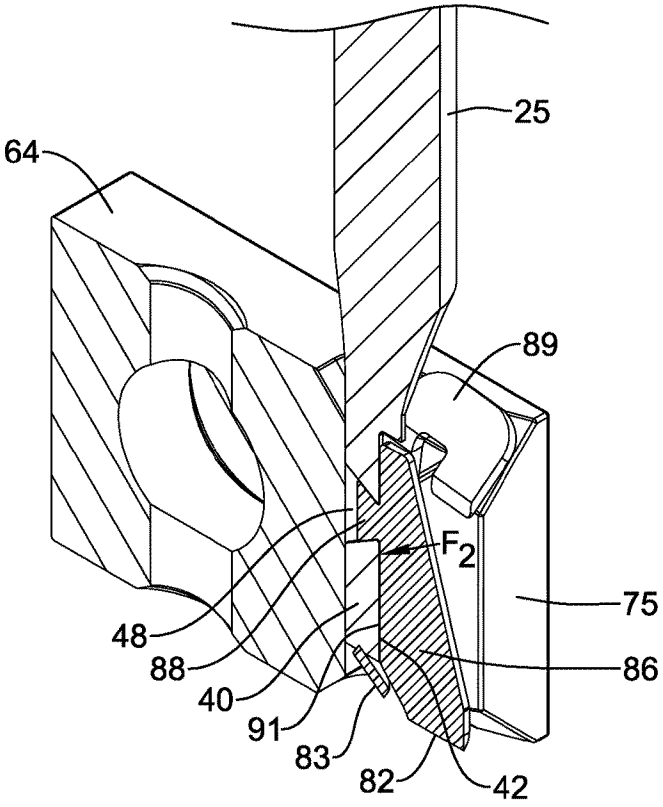
FIG. 18 is a cross-sectional view of the quick disconnect assembly of FIG. 16 taken along a second plane.
Figure 19:
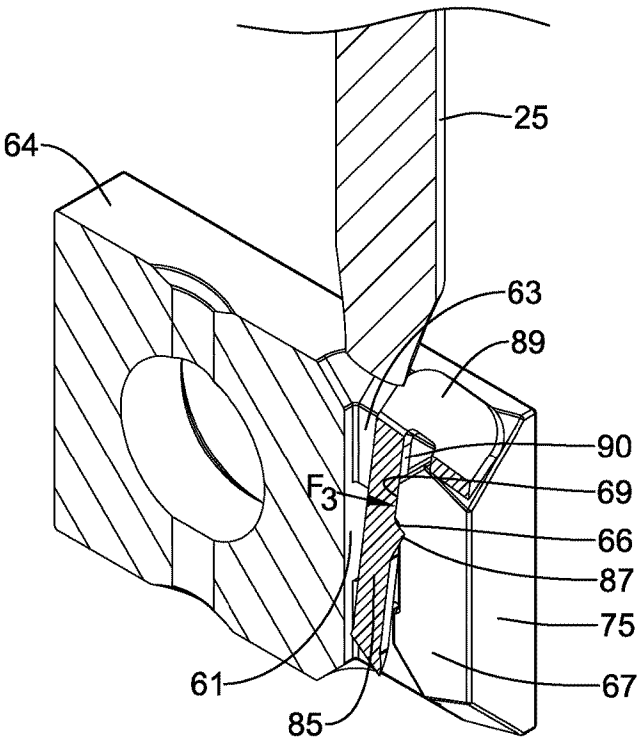
FIG. 19 is a cross-sectional view of the quick disconnect assembly of FIG. 16 taken along a third plane.

Additional features of the interaction of the components of the quick disconnect assembly 50 when removably coupled together will now be further described with reference to the cross-sectional views shown in FIGS. 17-19.

When the nugget 40 and resilient clip 80 are positioned in the cavity 62, the resilient clip 80 is displaced from its equilibrium position to provide a force that urges the rear surface 44 of the nugget 40 into direct contact with the rear surface 61 of the cavity 62 with a force F1, providing an electrically conductive pathway from the nugget 40 to the body 64. This force F1 between the rear surface 44 of the nugget 40 and the rear surface 61 of the cavity 62 may be maintained with the compressed resilient clip 80. For example, when the resilient clip 80 is positioned in the cavity 62 the resilient clip 80 is compressed (i.e., the inner arms 86 are deflected frontwardly while the outer arms 85 are deflected rearwardly at the living hinge 84 between the front portion 82 of the base 81 and the rear portion 83 of the base 81), providing an elastic force in the resilient clip 80. Thus, the rear edges 91 of the inner arms 86 press against the edges 49 of the projecting portions 45 of the nugget 40 to exert a force F2, while the front edges 90 of the outer arms 85 press against the jogs 69 in the sides of the cavity 62 to exert a force F3. Thus, when inserted into the cavity 62, the resilient clip 80 may be elastically deformed and loaded into compression to generate the exerted forces F2, F3 to provide the force F1 at the interface between the rear surface 44 of the nugget 40 and the rear surface 61 of the cavity 62.

Due to the overlapping nature of the inner arms 86 with the outer arms 85, when the resilient clip 80 is elastically deformed in compression, the rear edges 91 of the inner arms 86 move closer to the front edges 90 of the outer arms 85. However, in other embodiments, the resilient clip 80 may be configured such that the rear edges 91 of the inner arms 86 move away from the front edges 90 of the outer arms 85 when the resilient clip 80 is elastically deformed in compression.

Furthermore, when inserted into the cavity 62, the frontwardly extending tabs 87 may mate with and interlock with the recesses or lips 66 in the cavity 62 of the body 64 to inhibit the resilient clip 80 from being removed from the cavity 62. In order to remove the resilient clip 80, and thus the nugget 40, an external force would need to be applied to the outer arms 85 to move the outer arms 85 rearwardly (toward the rear surface 61 of the cavity 62) until the frontwardly extending tabs 87 clear or disengage from the recesses or lips 66 in the cavity 62. The applied force may be exerted on the wings 89 to effect movement of the outer arms 85 rearwardly.

In use, when it is determined that a brush 18 of the brush holder assembly 10 needs to be removed or replaced, the electrical connection to/from the brush 18 may be quickly and efficiently disconnected with the quick disconnect assembly 50. For example, to remove a first brush 18 from the brush holder assembly 10, the first brush 18 may be removed from the brush holder 12 and the end of the electrical lead 25, such as the nugget 40, along with a first resilient clip 80 coupled to the nugget 40, may be removed from the cavity 62 of the receptacle 60 (e.g., the body 64).

Thus, the brush 18 with the electrical lead 25 extending therefrom with the nugget 40 at the end of the electrical lead 25, along with the resilient clip 80, may be removed and replaced as an assembly. Thus, every time a brush 18 is replaced with a new brush 18, a new resilient clip 80 may be used to reduce the likelihood of failure of the resilient clip 80 due to fatigue.

To remove the resilient clip 80, and thus the nugget 40, an external force may be applied to the outer arms 85 (e.g., via the wings 89) to move the outer arms 85 rearwardly (toward the rear surface 61 of the cavity 62) until the frontwardly extending tabs 87 clear or disengage the recesses or lips 66 in the cavity 62. Once the tabs 87 clear the recesses or lips 66 in the cavity 62, the nugget 40 along with the resilient clip 80 coupled thereto may be removed from the cavity 62.

A second, replacement brush 18 may then be inserted into the brush holder 12 and the end (e.g., the nugget 40) of the electrical lead 25 extending from the second brush 18, along with a second, new resilient clip 80 coupled to the nugget 40, may be inserted into the cavity 62 of the receptacle 60 (e.g., the body 64). The nugget 40 and resilient clip 80 may be inserted into the cavity 62 until the frontwardly extending tabs 87 mate with and interlock with the recesses or lips 66 in the cavity 62 of the body 64 to releasably couple the nugget 40 and resilient clip 80 in the cavity 62.

With the nugget 40 and resilient clip 80 positioned in the cavity 62, the compressed resilient clip 80, which has been displaced from its equilibrium position, provides an elastic force that urges the rear surface 44 of the nugget 40 into direct contact with the rear surface 61 of the cavity 62 to provide an electrically conductive pathway from the nugget 40 to the body 64. Thus, when inserted into the cavity 62, the resilient clip 80 may be elastically deformed and loaded into compression to retain the resilient clip 80 and the nugget 40 in the cavity 62 and the nugget 40 in electrical contact with the rear surface 61 of the cavity 62 to allow an electrical current to pass therebetween. Thus, an electrical pathway may be provided from the second brush 18, through the electrical lead 25, to a surface of the receptacle 60 from the nugget 40, and on to the base member or yoke 30.

Figure 20:
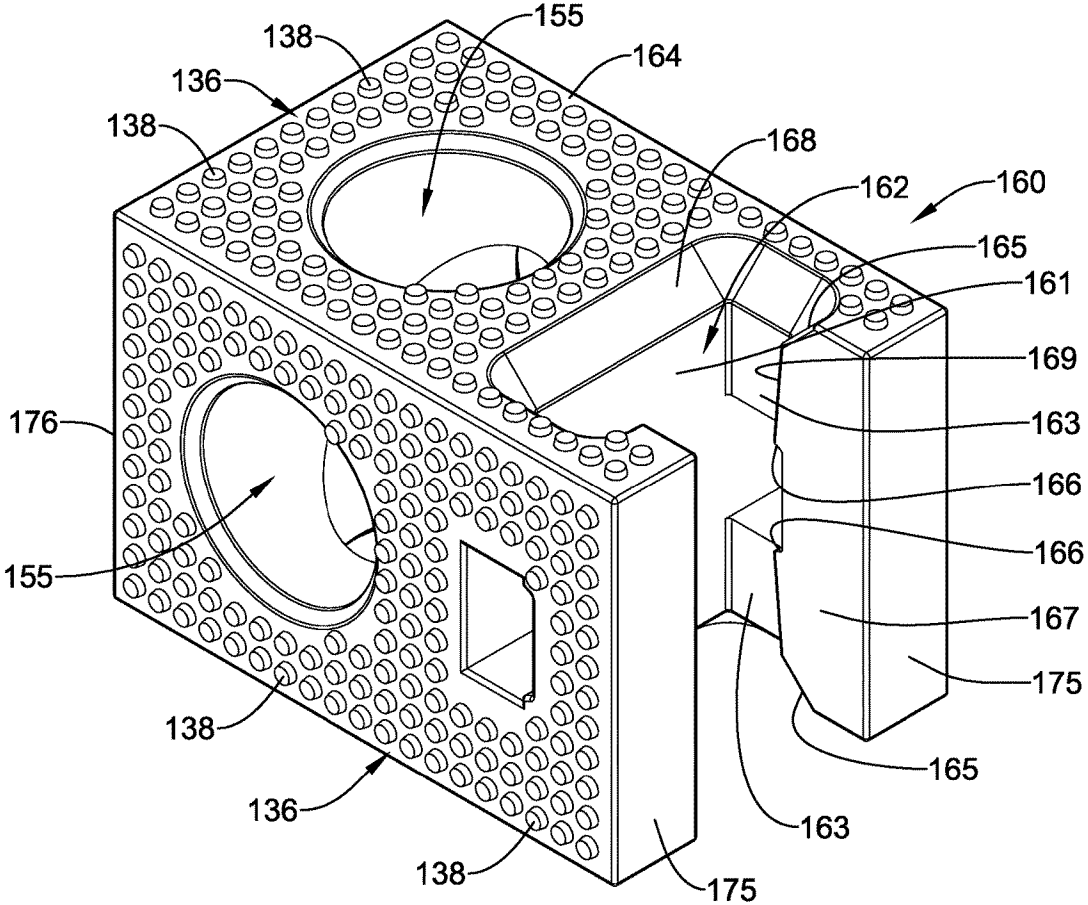
FIG. 20 is a perspective view of another exemplary receptacle of a quick disconnect assembly.

Another embodiment of a receptacle 160 for use in a quick disconnect assembly in an electrical pathway of a brush holder assembly will now be described with reference to FIG. 20. The receptacle 160 may be similar to the receptacle 60 in many respects. For instance, the receptacle 160 may be formed of a body 164, such as a rigid metal block, having a first side 171, a second side 172 opposite the first side 171, a third side 173, a fourth side 174 opposite the third side 173, a first end 175 and a second end 176 opposite the first end 175. The body 164, in the form of a rigid metal block, may be an inert structure which does not flex, bend, deform, or otherwise change shape during normal operation. The body 164 may include one or more bores 155 extending through the body 164 for receiving a bolt or other fastener to secure the body 164 to a component of a brush holder assembly. The body 164 may be formed of a conductive material, such as those materials discussed above.

The cavity 162 in the body 164 may be configured to removably receive the nugget 40 of an electrical lead 25 and a resilient clip 180 therein to complete an electrical pathway from the nugget 40 to the receptacle 160. The cavity 162 may include a beveled opening 168 opening into the cavity 162 from the first side 171 and/or a beveled opening 168 opening into the cavity 162 from the second side 172 to facilitate insertion of the nugget 40 and resilient clip 180.

Figure 21:
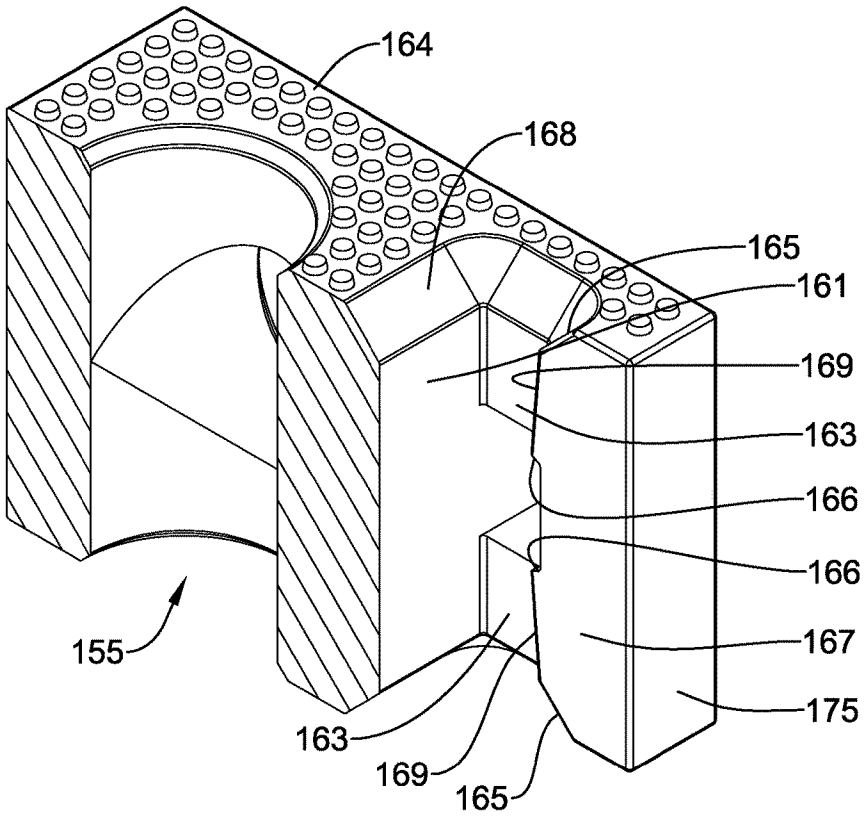
FIG. 21 is a cross-sectional view of the receptacle of FIG. 20.

As shown in FIG. 21, similar to the cavity 62, the cavity 162 may be defined by a plurality of walls or surfaces, including a rear surface 161, first and second side surfaces 163, and third and fourth side surfaces 167 nonplanar with the first and second side surfaces 163. The first and second side surfaces 163 may be parallel to, but offset from the third and fourth side surfaces 167, forming a jog 169 in the sides of the cavity 162 providing a transition at the jog 169. The cavity 162 may include sloped surfaces 165 at the jog 169 to facilitate entry into the cavity 162. Furthermore, the cavity 162 may include recesses, edges or lips 166 formed in the jog 169 of the sides of the cavity 162 for providing an interlocking geometry with the resilient clip 180.

One or more of the surfaces of the body 164 may include a plurality of crush points 136 extending from the surface(s) configured to be pressed against another component of the brush holder assembly 10 (e.g., the base member or yoke 30 or brush holder 12) to enhance electrical connectivity between the body 164 and the other component of the brush holder assembly 10 (e.g., the base member or yoke 30 or brush holder 12) in the electrical current pathway. The crush points 136 may be configured to be deformed or crushed when compressed against the conductive surface of the other component. The crush points 136 may provide a heat sink between the body 164 and the conductive surface against which the body 164 is pressed against. In such an embodiment, the electrical contact between the body 164 and the conductive surface may be spread over a larger interface.

In some instances, the crush points 136 may be small protuberances 138 protruding from an otherwise flat surface of the body 164. Some possible shapes of the protuberances 138 include conical, pyramidal, or hemispherical shapes. In other instances, the protuberances 138 may be formed as ridges on the surface(s) of the body 164 or portions of the body 164 remaining between grooves formed in the body 164. The small protuberances 138 may be arranged in a regular pattern (e.g., a rectangular array) or irregularly arranged on the surface(s). In some instances, the crush points 136 may be knurlings in the surface(s) of the body 164, or other surface roughenings. The crush points 136 may be cast into the body 164 while forming the body 164, or the crush points 136 may be added to the body 164 in a subsequent process, such as a machining process.

Figure 22:
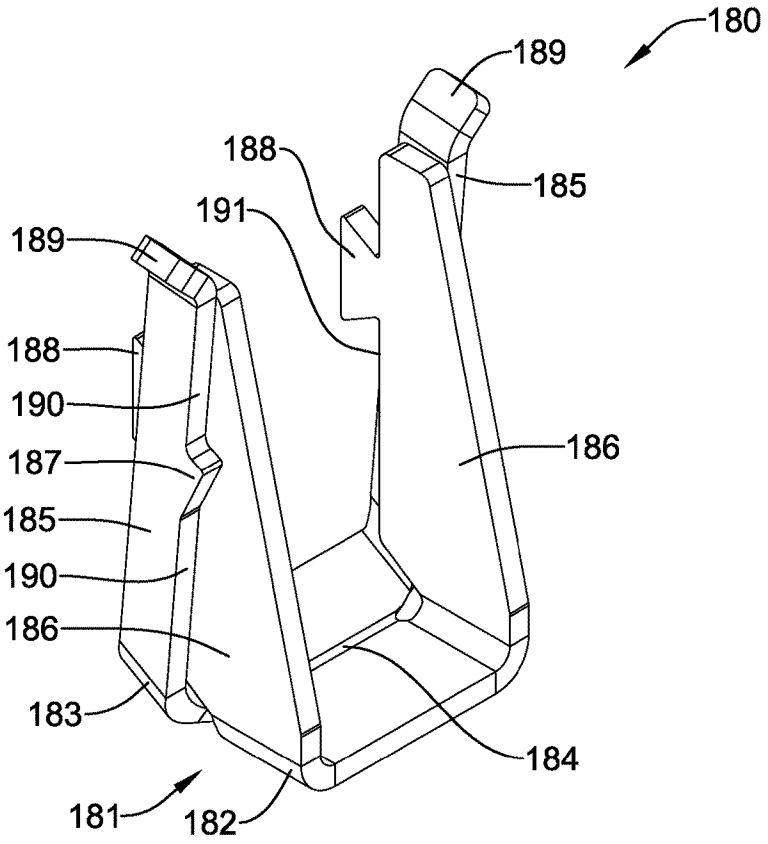
FIG. 22 is a perspective view from the front of an exemplary resilient clip of a quick disconnect assembly for use with the receptacle of FIG. 20.

The resilient clip 180 configured for use with the body 164 is illustrated in FIG. 22. The resilient clip 180, which may be formed of a resilient material giving the resilient clip 180 a degree of springiness (i.e., elastic flexibility), may be similar to the resilient clip 80 in many respects. For instance, the resilient clip 180 may include a base 181 having a front portion 182 at an oblique angle to a rear portion 183 with a living hinge 184 between the front portion 182 and the rear portion 183 to provide a flexing region between the front portion 182 and the rear portion of the base 181.

The resilient clip 180 may include a pair of outer arms 185 extending from the rear portion 183 and a pair of inner arms 186 extending from the front portion 182. The outer arms 185 may include wings 189 at the upper end of the outer arms 185. The inner arms 186 may be positioned between the outer arms 185. In other words, the inner arms 186 may be positioned a first distance apart, while the outer arms 185 may be positioned a second distance apart greater than the first distance between the inner arms 186. Thus, the outer arms 185 may overlap with the inner arms 186 when viewed from the side.

The outer arms 185 may include frontwardly extending tabs 187, configured to interlock with mating geometry (e.g., the recesses or lips 66) in the cavity 62, extending from a front edge 190 of the outer arms 185. Additionally, the inner arms 186 may include rearwardly extending tabs 188, configured to interlock with mating geometry (e.g., the notches 48) of the nugget 40, extending from a rear edge 191 of the inner arms 186.

The resilient clip 180 may be removably coupled to the nugget 40, in a similar fashion to that described above regarding the resilient clip 80. When coupled to the nugget 40, the rear edges 191 of the inner arms 186 may face and contact the edges 49 of the projecting portions 45 of the nugget 40 while the outer arms 185 are positioned outward of the projecting portions 45 and facing the side surfaces 46 of the nugget 40. Furthermore, the end of the nugget 40 may contact and press against the rear portion 183 of the base 181 of the resilient clip 180. Such a configuration may resiliently couple the resilient clip 180 to the nugget 40 and maintain a residual force between the resilient clip 180 and the nugget 40.

Figure 23:
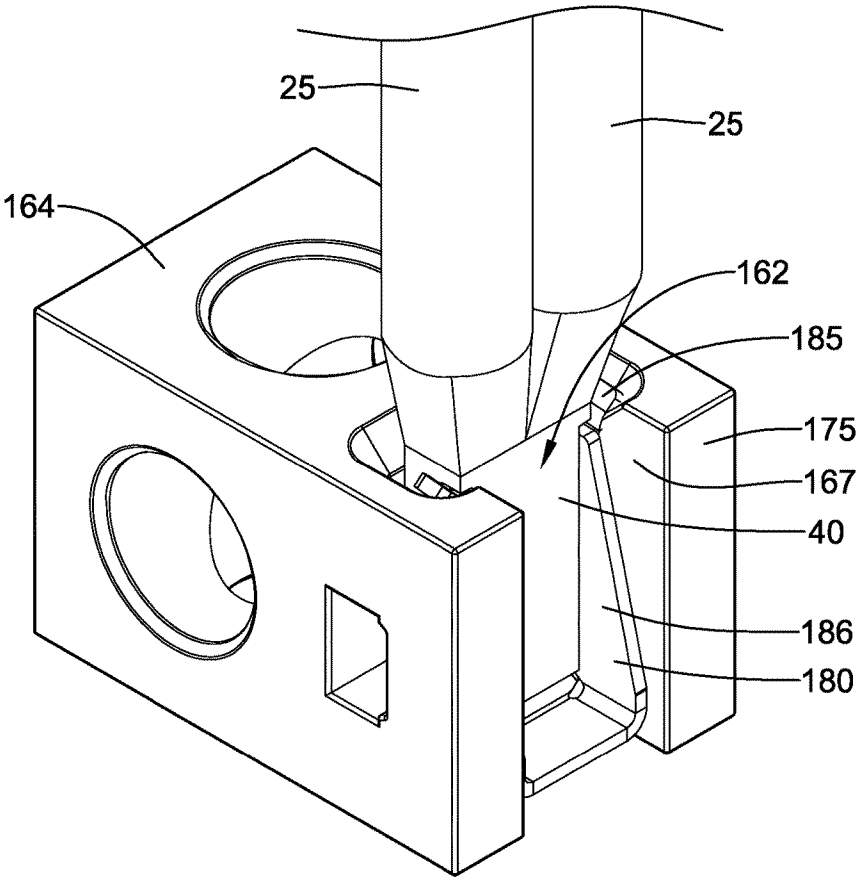
FIG. 23 is a perspective view of the components of a quick disconnect assembly shown in FIGS. 20 and 22 coupled together.

With the resilient clip 180 coupled to the nugget 40, the combination of the resilient clip 180 and nugget 40 may be inserted into the cavity 162 of the receptacle 160 (e.g., the body 164). As shown in FIG. 23, the resilient clip 180 may be sized and shaped such that the outer arms 185 fit in the enlarged portion of the cavity 162 defined between the first and second side surfaces 163 while the inner arms 186 fit in the smaller portion of the cavity 162 defined between the third and fourth side surfaces 167. Thus, the outer arms 185 may be interposed between the side surfaces 46 of the nugget 40 and the first and second side surfaces 163 of the cavity 162, while the inner arms 186 may extend from the edges 49 formed in the front surface 42 of the nugget 40 into the region of the cavity 162 defined between the third and fourth side surfaces 167. When properly positioned in the cavity 162, the wings 189 may come into contact with the beveled opening 168 of the cavity 162 to prevent further advancement of the resilient clip 180 and nugget 40 into the cavity 162.

Figure 24:
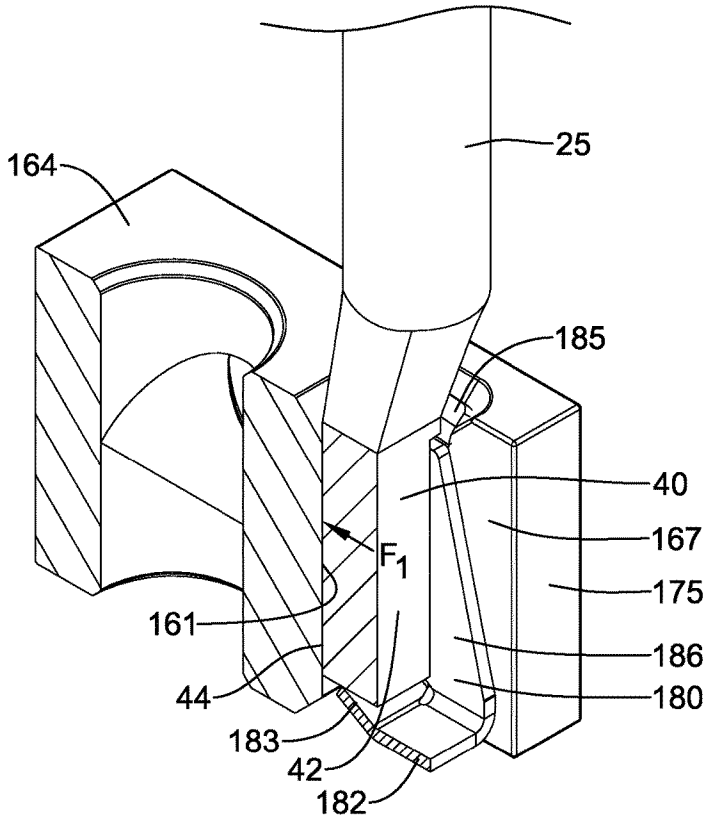
FIG. 24 is a cross-sectional view of the quick disconnect assembly of FIG. 23 taken along a first plane.
Figure 25:
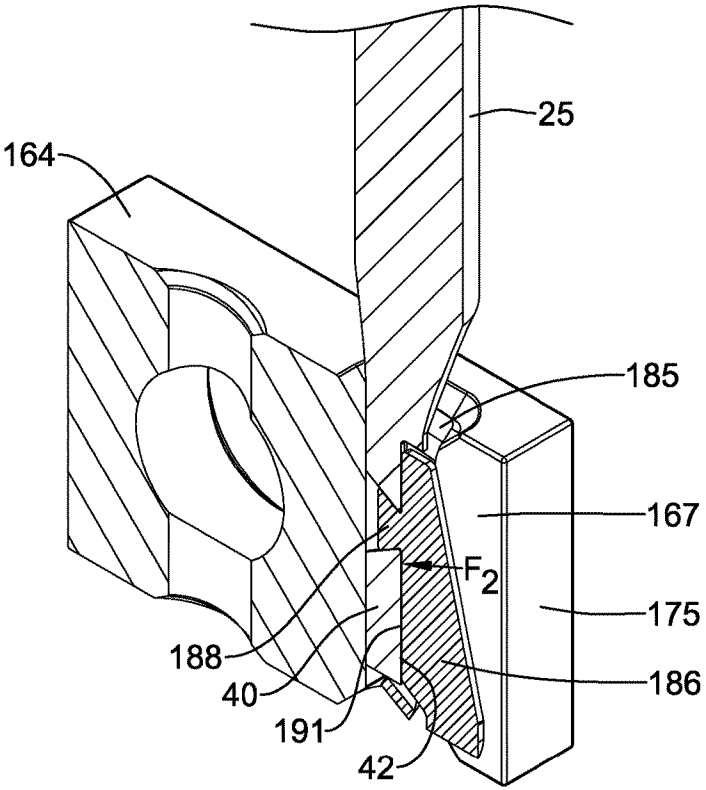
FIG. 25 is a cross-sectional view of the quick disconnect assembly of FIG. 23 taken along a second plane.
Figure 26:
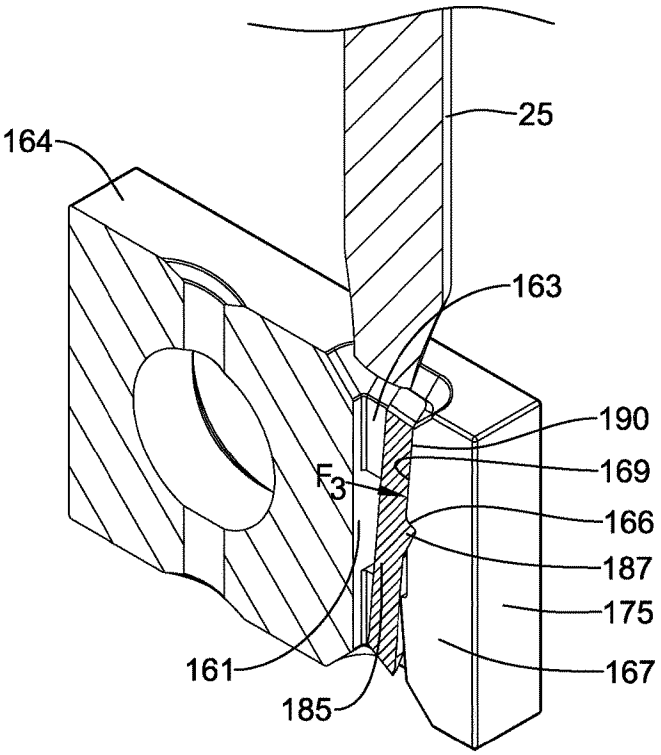
FIG. 26 is a cross-sectional view of the quick disconnect assembly of FIG. 23 taken along a third plane.

As shown in FIGS. 24-26, when the nugget 40 and resilient clip 180 are positioned in the cavity 162, the resilient clip 180 is displaced from its equilibrium position to provide a force that urges the rear surface 44 of the nugget 40 into direct contact with the rear surface 161 of the cavity 162 with a force F1, providing an electrically conductive pathway from the nugget 40 to the body 164. This force F1 between the rear surface 44 of the nugget 40 and the rear surface 161 of the cavity 162 may be maintained with the compressed resilient clip 180. In maintaining the elastic compression of the resilient clip 180, the rear edges 191 of the inner arms 186 press against the edges 49 of the projecting portions 45 of the nugget 40 to exert a force F2, while the front edges 190 of the outer arms 185 press against the jogs 169 in the sides of the cavity 162 to exert a force F3. Thus, when inserted into the cavity 162, the resilient clip 180 may be elastically deformed and loaded into compression to generate the exerted forces F2, F3 to provide the force F1 at the interface between the rear surface 44 of the nugget 40 and the rear surface 161 of the cavity 162.

When inserted into the cavity 162, the frontwardly extending tabs 187 may mate with and interlock with the recesses or lips 166 in the cavity 162 of the body 164 to inhibit the resilient clip 180 from being removed from the cavity 162. In order to remove the resilient clip 180, and thus the nugget 40, an external force would need to be applied to the outer arms 185 to move the outer arms 185 rearwardly (toward the rear surface 161 of the cavity 162) until the frontwardly extending tabs 187 clear the recesses or lips 166 in the cavity 162. The applied force may be exerted on the wings 189 to effect movement of the outer arms 185 rearwardly.

Figure 27:
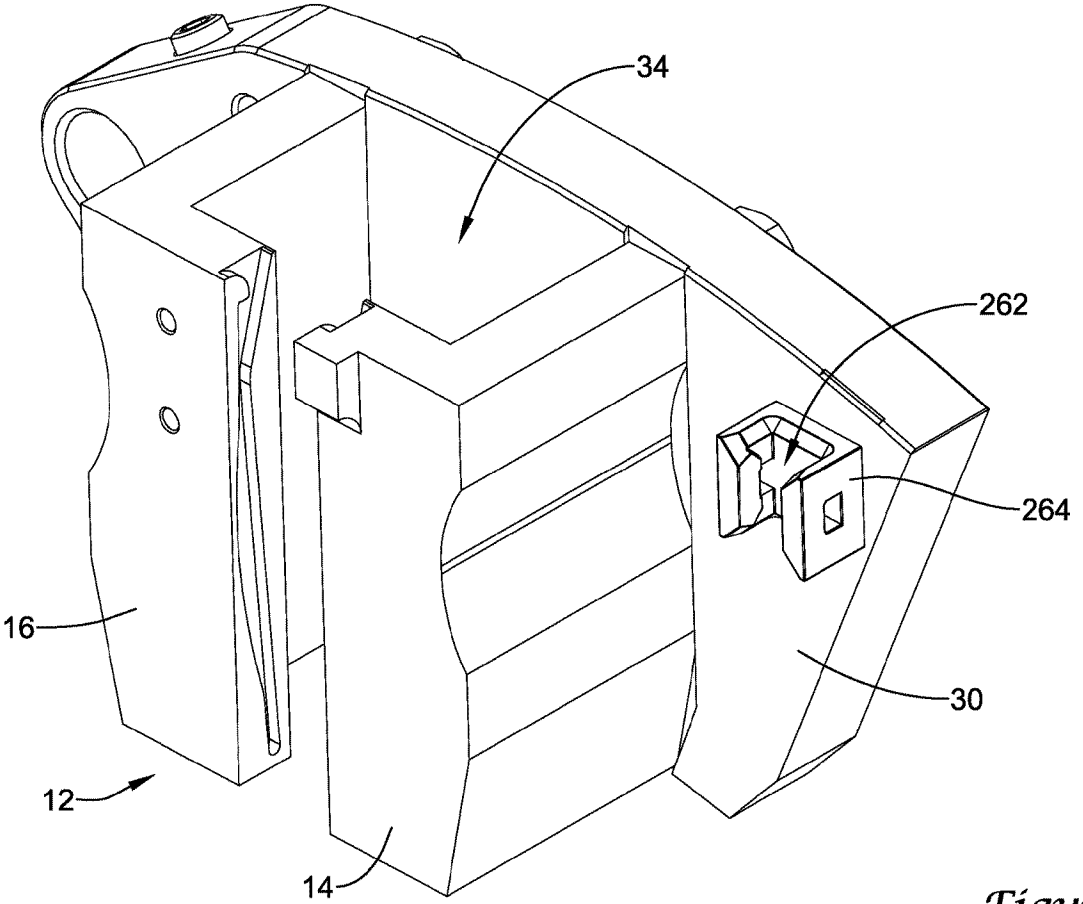
FIGS. 27-29 illustrate alternative embodiments of a receptacle of a quick disconnect assembly of an electrical connection in a brush holder assembly.
Figure 28:
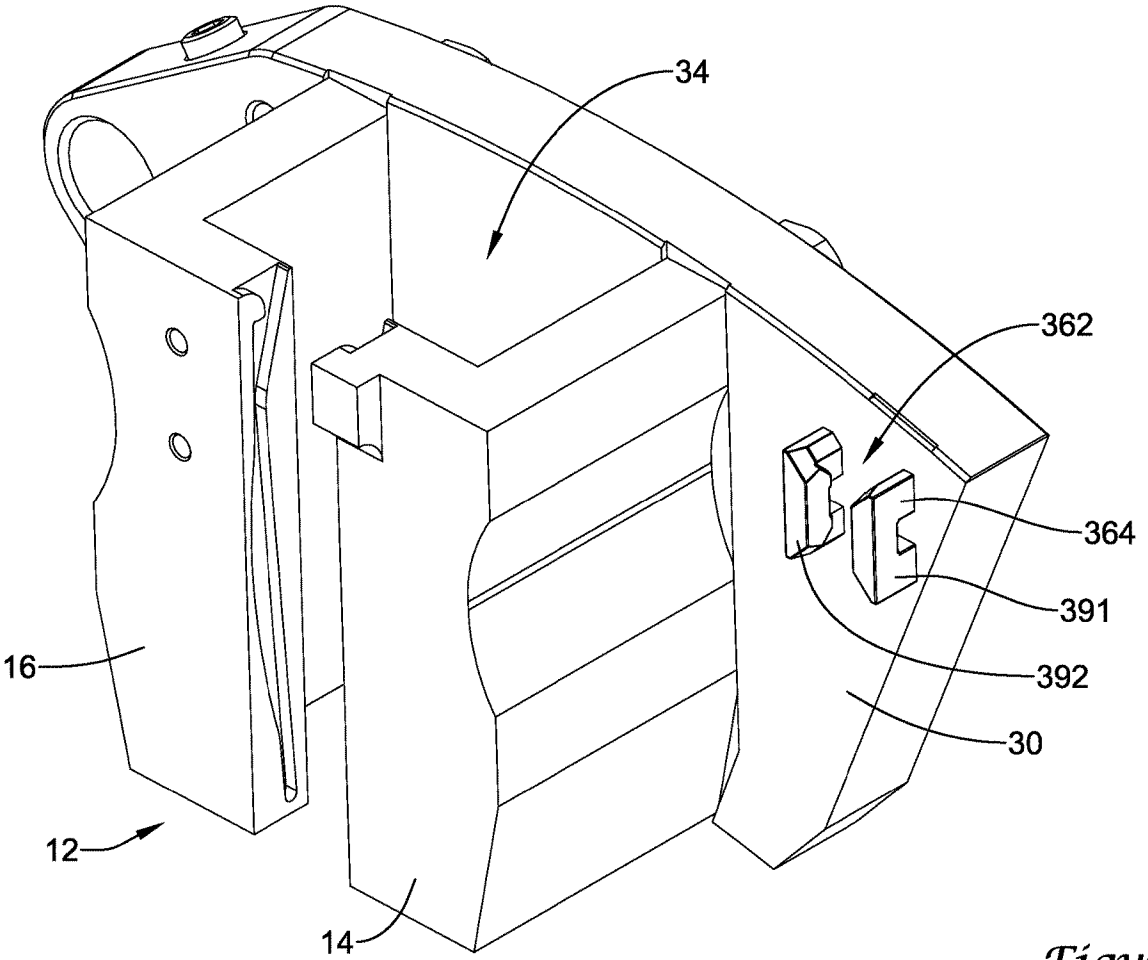

In other embodiments, the body 64, 164 may be formed without bores 55, 155 and secured to or incorporated with either the stationary member or yoke 30 or the brush holder 12, or other component of the brush holder assembly 10, by other means, such as welding. In such embodiments, the body 64, 164 need only be large enough to include the cavity 62, 162. For example, FIG. 27 illustrates one embodiment in which the body 264, having the cavity 262 for removably receiving and an end of the electrical lead 25, such as the nugget 40, 140 and the resilient clip 80, 180 is secured to the stationary member or yoke 30. In another embodiment, shown in FIG. 28, the body 364 may be formed of two separate pieces, 391, 392 secured to either the stationary member or yoke 30 or the brush holder 12, or other component of the brush holder assembly 10 such as by welding. Thus, the cavity 362 may be partially defined by the conductive surface of the base member or yoke 30, as well as interior surfaces of the two separate pieces, 391, 392 of the body 364. Accordingly, a surface of the nugget 40, 140 may directly contact the conductive surface of the base member or yoke 30 when inserted into the cavity 362. It is noted that in such embodiments, the cavity 262, 362 may be configured similar to the cavity 62, 162 described herein in order to receive the nugget 40, 140 and resilient clip 80, 180.

Figure 29:
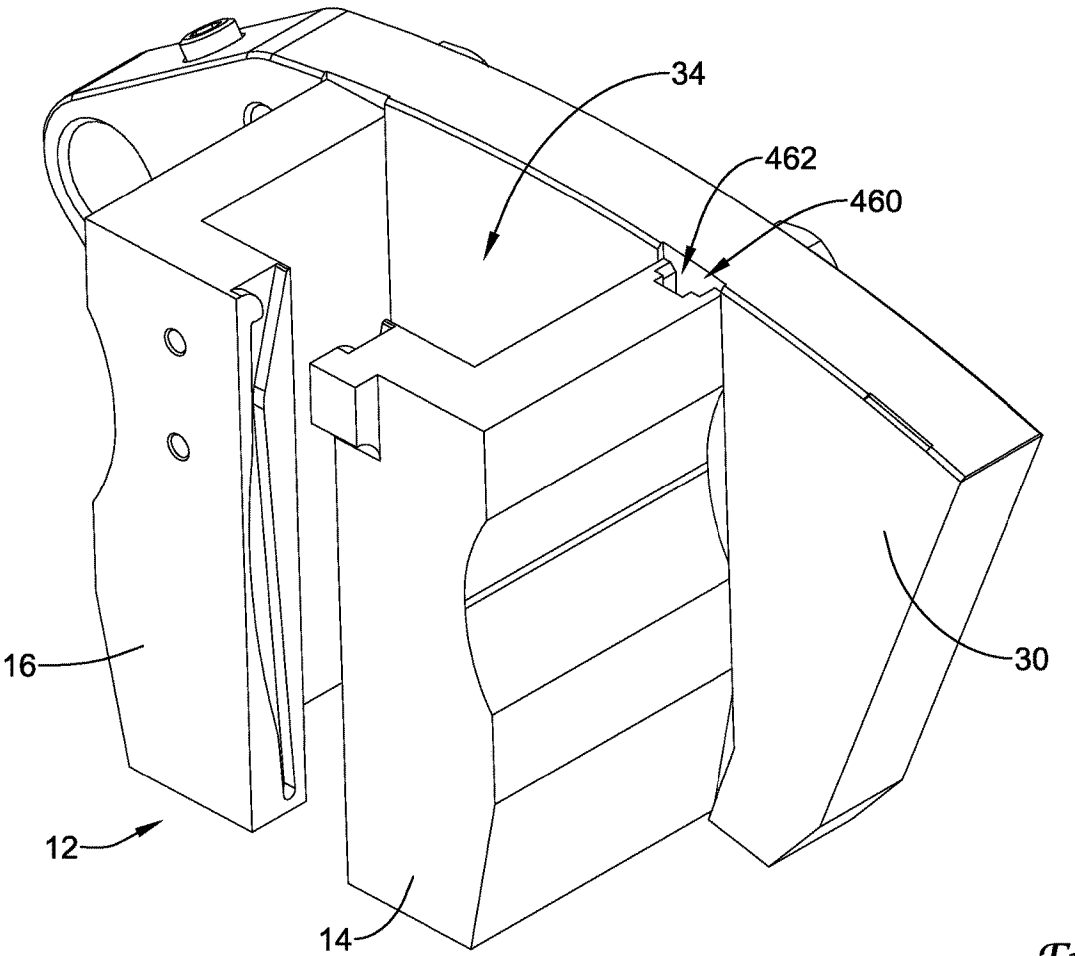

In other embodiments, such as shown in FIG. 29, a receptacle 460 sized and shaped to receive the nugget 40, 140 and resilient clip 80, 180 therein may be formed integrally with a component of the brush holder assembly 10, such as the brush holder 12 or other component such as the base member or yoke 30. In other words, the brush holder 12, or other component such as the base member or yoke 30, may be formed with the cavity 462 defining the receptacle 460 as a unitary portion of the brush holder 12, or other component such as the base member or yoke 30. When inserted into the cavity 462 of the receptacle 460, a surface of the nugget 40, 140 may directly contact the conductive surface of the base member or yoke 30, providing an electrically conductive pathway directly therebetween. It is noted that in such embodiments, the cavity 462 may be configured similar to the cavity 62, 162 described herein in order to removably receive the nugget 40, 140 and resilient clip 80, 180 therein.

Those skilled in the art will recognize that the present invention may be manifested in a variety of forms other than the specific embodiments described and contemplated herein. Accordingly, departure in form and detail may be made without departing from the scope and spirit of the present invention as described in the appended claims.

What is claimed is:

1. A brush holder assembly comprising:

a brush holder mounted to a stationary member;

a brush slidably disposed in the brush holder;

an electrical lead having a first end secured to the brush and a second end;

a resilient clip removably coupled to the second end of the electrical lead; and a receptacle for removably receiving *both* the second end of the electrical lead *within the receptacle* and the resilient clip [therein] *within the receptacle*;

wherein an electrical pathway is provided from the brush, through the electrical lead, to a surface of the receptacle;

wherein the resilient clip and the second end of the electrical lead are removable from the receptacle simultaneously as a unit*;*

*wherein the second end of the electrical lead includes a nugget;*

*wherein the nugget is a separately formed structure secured to filaments of the electrical lead.*

2. [The brush holder assembly of claim 1,] *A brush holder assembly comprising:*

*a brush holder mounted to a stationary member;*

*a brush slidably disposed in the brush holder;*

*an electrical lead having a first end secured to the brush and a second end;*

*a resilient clip removably coupled to the second end of the electrical lead; and*

*a receptacle for removably receiving the second end of the electrical lead and the resilient clip therein;*

*wherein an electrical pathway is provided from the brush, through the electrical lead, to a surface of the receptacle;*

*wherein the resilient clip and the second end of the electrical lead are removable from the receptacle simultaneously as a unit; and* wherein the resilient clip urges a surface of the second end of the electrical lead into direct contact with the surface of the receptacle.

3. The brush holder assembly of claim 2, wherein the second end of the electrical lead includes a nugget formed of a plurality of wire strands of the electrical lead.

4. The brush holder assembly of claim 3, wherein the nugget is formed by ultrasonically welding together the plurality of wire strands into a formed shape.

5. A brush holder assembly comprising:

a brush holder mounted to a stationary member;

a brush slidably disposed in the brush holder;

an electrical lead having a first end secured to the brush and a second end;

a resilient clip removably coupled to the second end of the electrical lead; and a receptacle for removably receiving the second end of the electrical lead and the resilient clip therein;

wherein an electrical pathway is provided from the brush, through the electrical lead, to a surface of the receptacle;

wherein the resilient clip urges a surface of the second end of the electrical lead into direct contact with the surface of the receptacle;

wherein the second end of the electrical lead includes a nugget formed of a plurality of wire strands of the electrical lead;

wherein the nugget is formed by securing end portions of the electrical lead in a channel of a U-shaped sleeve.

6. The brush holder assembly of claim 5, wherein a surface of the U-shaped sleeve contacts the surface of the receptacle.

7. The brush holder assembly of claim 6, wherein the resilient clip faces three surfaces of the nugget, the three surfaces including a front surface opposite the surface of the U-shaped sleeve contacting the surface of the receptacle and first and second side surfaces extending between the front surface and the surface of the U-shaped sleeve contacting the surface of the receptacle.

8. The brush holder assembly of claim 5, wherein the U-shaped sleeve is configured to accept electrical leads of various gauges, sizes or quantities.

9. The brush holder assembly of claim 1, wherein the receptacle includes a body with a cavity formed therein for removably receiving *both* the second end of the electrical lead *within the cavity* and the resilient clip *within the cavity*.

10. The brush holder assembly of claim 9, wherein the body is bolted to either the stationary member or the brush holder.

11. The brush holder assembly of claim 1, wherein the receptacle is integrally formed in either the stationary member or the brush holder.

12. The brush holder assembly of claim 1, wherein during replacement of the brush, the resilient clip is decoupled from the receptacle and removed with the brush and electrical lead.

13. An assembly for providing an electrical current pathway through a brush holder assembly, the assembly comprising:

a brush for contacting a moving conductive surface;

an electrical lead having a first end secured to the brush and a second end;

a nugget at the second end of the electrical lead;

a resilient clip removably coupled to the nugget; and a receptacle having a cavity for removably receiving the nugget and the resilient clip therein;

wherein the resilient clip urges a surface of the nugget into direct contact with a surface of the receptacle partially defining the cavity;

wherein an electrical current pathway is provided from the brush through the electrical lead to the nugget, and from the surface of the nugget to the surface of the receptacle.

14. The assembly of claim 13, wherein the nugget includes a first side, a second side opposite the first side, a third side extending between the first side and the second side, and a fourth side opposite the third side extending between the first side and the second side;

wherein the resilient clip faces or contacts each of the first, second and third sides of the nugget.

15. The assembly of claim 14, wherein the fourth side of the nugget includes the surface in direct contact with the surface of the receptacle.

16. The assembly of claim 13, wherein the resilient clip includes one or more tabs configured to interlock in one or more recesses formed in the nugget.

17. The assembly of claim 16, wherein the resilient clip includes one or more tabs configured to interlock with one or more recesses formed in the receptacle.

18. The assembly of claim 13, wherein the nugget is formed by ultrasonically welding together a plurality of wire strands of the electrical lead into a formed shape.

19. The assembly of claim 13, wherein the receptacle includes a body having the cavity extending from a first surface of the body to a second surface of the body, the body being symmetrical about two perpendicular planes of symmetry such that the nugget and the resilient clip may be inserted into the cavity of the body from either the first surface of the body or the second surface of the body.

20. A method of replacing a brush in a brush holder of a brush holder assembly, the method comprising:

removing a first brush from the brush holder by decoupling an end of a first electrical lead extending from the first brush simultaneously along with a first resilient clip from a receptacle;

inserting a second brush into the brush holder, the second brush having a second electrical lead extending from the brush and a second resilient clip coupled to an end of the second electrical lead; and inserting *both* the end of the second electrical lead *into a cavity of a receptacle* and the second resilient clip into [a] *the* cavity of [a] *the* receptacle to provide an electrical pathway from the second brush, through the second electrical lead, to a surface of the receptacle*;*

*wherein the end of the second electrical lead includes a nugget;*

*wherein the nugget is a separately formed structure secured to filaments of the second electrical lead.*

21. The method of claim 20, wherein the end of the second electrical lead and the second resilient clip are removably retained in the cavity of the receptacle by a spring force applied by the second resilient clip.

22. The method of claim 21, wherein the second resilient clip is removably coupled to a shaped nugget at the end of the second electrical lead that is integrally formed from a plurality of wire strands of the electrical lead.

23. The method of claim 22, wherein the second resilient clip and the shaped nugget include interlocking geometry to retain the second resilient clip coupled to the shaped nugget.

24. A method of replacing a brush in a brush holder of a brush holder assembly, the method comprising:

removing a first brush from the brush holder by decoupling an end of a first electrical lead extending from the first brush along with a first resilient clip from a receptacle;

inserting a second brush into the brush holder, the second brush having a second electrical lead extending from the brush and a second resilient clip coupled to an end of the second electrical lead; and inserting the end of the second electrical lead and the second resilient clip into a cavity of a receptacle to provide an electrical pathway from the second brush, through the second electrical lead, to a surface of the receptacle;

wherein the end of the second electrical lead and the second resilient clip are removably retained in the cavity of the receptacle by a spring force applied by the second resilient clip;

wherein the second resilient clip is removably coupled to a shaped nugget at the end of the second electrical lead that is integrally formed from a plurality of wire strands of the electrical lead;

wherein the second resilient clip urges a surface of the shaped nugget into direct contact with the surface of the receptacle.

25. An assembly for providing an electrical current pathway through a brush holder assembly, the assembly comprising:

a brush for contacting a moving conductive surface;

an electrical lead having a first end secured to the brush and a second end;

a nugget at the second end of the electrical lead, the nugget including a rear surface, a front surface opposite the rear surface, and first and second side surfaces extending between the front surface and the rear surface;

a resilient clip removably coupled to the nugget, the resilient clip contacting the front surface and facing the first and second side surfaces of the nugget; and a receptacle having a cavity for removably receiving the nugget and the resilient clip therein;

wherein the resilient clip is elastically compressed in the cavity to press against the nugget and urge the rear surface of the nugget into direct contact with a surface of the receptacle partially defining the cavity;

wherein an electrical current pathway is provided from the brush through the electrical lead to the nugget, and from the rear surface of the nugget to the surface of the receptacle.

26. The assembly of claim 25, wherein the resilient clip does not contact the rear surface of the nugget.

27. The assembly of claim 25, wherein the nugget is formed by securing an end portion of the electrical lead in a channel of a U-shaped sleeve.

28. The assembly of claim 27, wherein a first surface of the U-shaped sleeve defines the rear surface of the nugget.

29. The assembly of claim 28, wherein the U-shaped sleeve includes first and second wing portions extending from a back portion of the U-shaped sleeve, wherein the resilient clip presses against an edge of the first wing portion and an edge of the second wing portion.

30. The assembly of claim 29, wherein the resilient clip includes tabs in interlocking engagement with notches formed in the first and second wing portions.

31. The assembly of claim 25, wherein the front surface of the nugget includes first and second stepped edges and the resilient clip includes first and second arms contacting the first and second stepped edges of the front surface of the nugget.

*32. The brush holder assembly of claim 13, wherein the nugget is a monolithic structure of the electrical lead.*

*33. The assembly of claim 13, wherein the nugget is a separately formed structure secured to filaments of the electrical lead.*

*34. The method of claim 20, wherein the second resilient clip is removably coupled to a shaped nugget secured to filaments of the electrical lead.*

*35. The assembly of claim 25, wherein the nugget is a monolithic structure of the electrical lead.*

*36. The assembly of claim 25, wherein the nugget is a separately formed structure secured to filaments of the electrical lead.*

*37. The brush holder assembly of claim 2, wherein the second end of the electrical lead includes a nugget.*

*38. The brush holder assembly of claim 37, wherein the nugget is a monolithic structure of the electrical lead.*

*39. The brush holder assembly of claim 37, wherein the nugget is a separately formed structure secured to filaments of the electrical lead.*

* * * * *